(12) United States Patent
Schempf et al.

(10) Patent No.: US 6,517,457 B2
(45) Date of Patent: Feb. 11, 2003

(54) DYNAMICALLY STEERABLE MONO BELT APPARATUS

(75) Inventors: Hagen Schempf, Fox Chapel, PA (US); William A. Crowley, Pittsburgh, PA (US); Robert A. Fuchs, Pittsburgh, PA (US); Joshua N. Guyot, Palo Alto, CA (US); Edward C. Mutschler, Jr., Wexford, PA (US)

(73) Assignee: Automatika, Inc., Pittsburgh, PA (US)

( * ) Notice: Subject to any disclaimer, the term of this patent is extended or adjusted under 35 U.S.C. 154(b) by 26 days.

(21) Appl. No.: 09/800,109

(22) Filed: Mar. 6, 2001

(65) Prior Publication Data

US 2001/0031680 A1 Oct. 18, 2001

Related U.S. Application Data

(60) Provisional application No. 60/187,374, filed on Mar. 6, 2000.

(51) Int. Cl.[7] .............................................. F16H 55/30
(52) U.S. Cl. ...................................................... 474/152
(58) Field of Search ................................ 474/152, 157, 474/162–164; 180/9.46, 9.49, 9.1, 9.62, 313; 305/44–46, 50, 53, 185

(56) References Cited

U.S. PATENT DOCUMENTS 3,973,638 A * 8/1976 Pohjola ..................... 180/9.46
4,453,611 A * 6/1984 Stacy, Jr. ................... 180/9.44

* cited by examiner

Primary Examiner—Jack Lavinder
Assistant Examiner—Clifford Bartz
(74) Attorney, Agent, or Firm—Webb Ziesenheim Logsdon Orkin & Hanson, P.C.

(57) ABSTRACT

The present invention is a dynamically steerable mono belt apparatus and includes a first pivotable body element in communication with a second pivotable body element. A first pivot mechanism is attached to and positioned between the first pivotable body element and the second pivotable body element to allow the first pivotable body element to pivot in a first pivot plane of movement with respect to the second pivotable body element. The present invention also includes a continuous belt element formed as a loop and continuously rotatable in a first plane of rotation around the first pivotable body element, the first pivot mechanism and the second pivotable body element. The continuous belt element is flexible in the pivot plane of movement, such that when the first pivotable body element is pivoted, via the first pivot mechanism, in the pivot plane of movement, the continuous belt element is flexed.

35 Claims, 26 Drawing Sheets

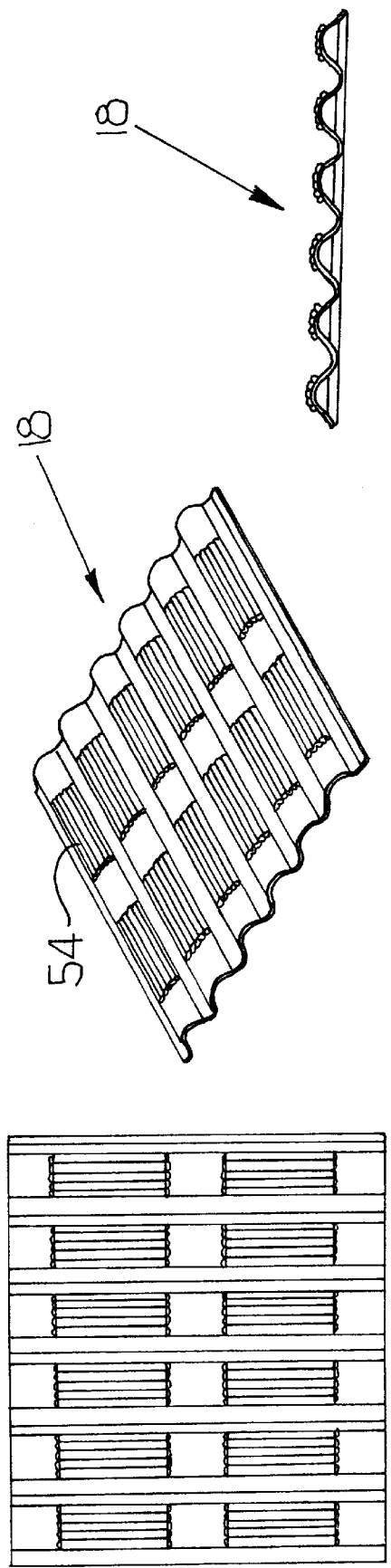
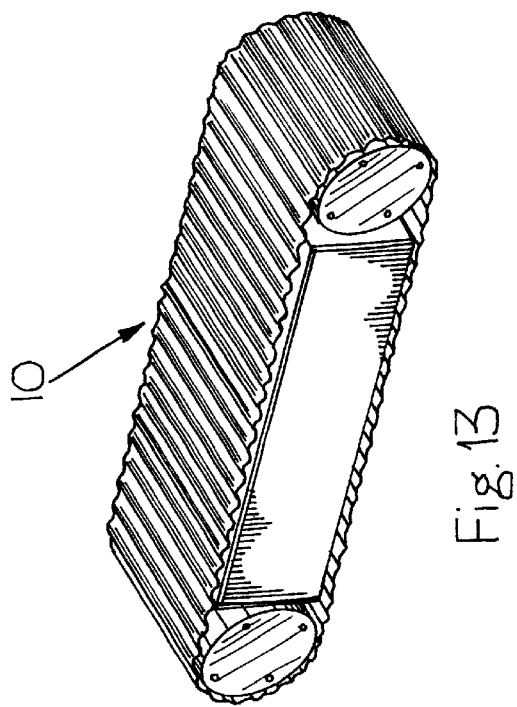
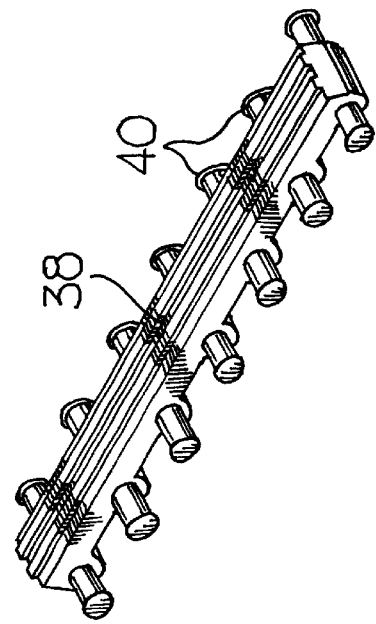

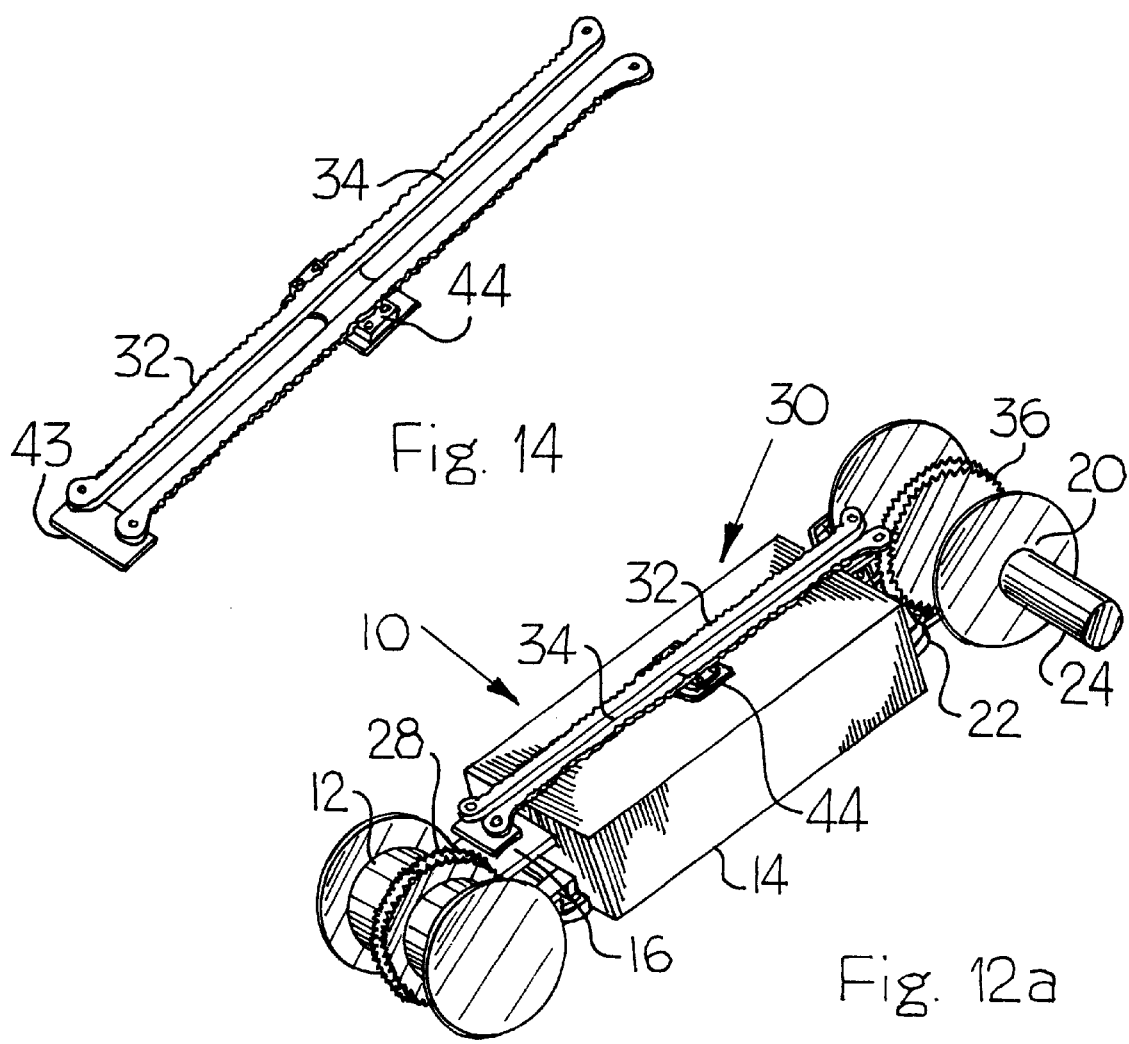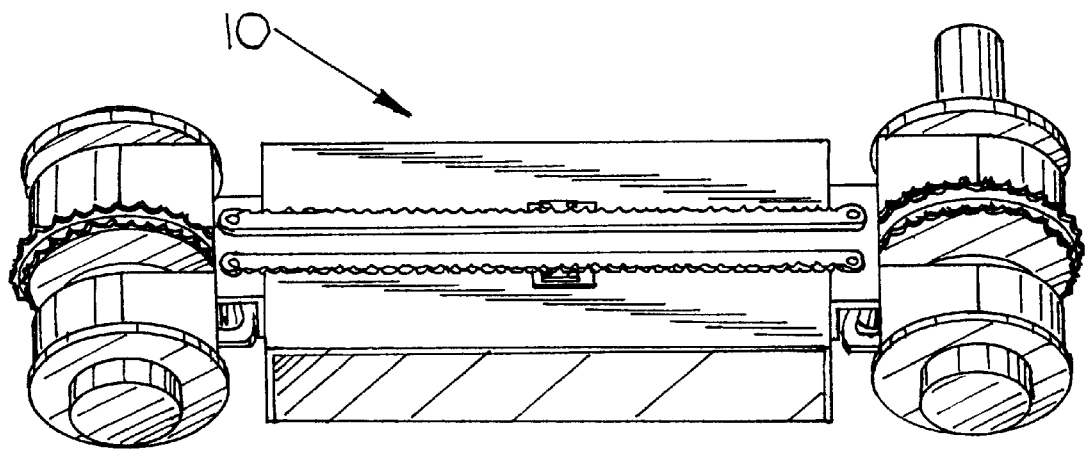

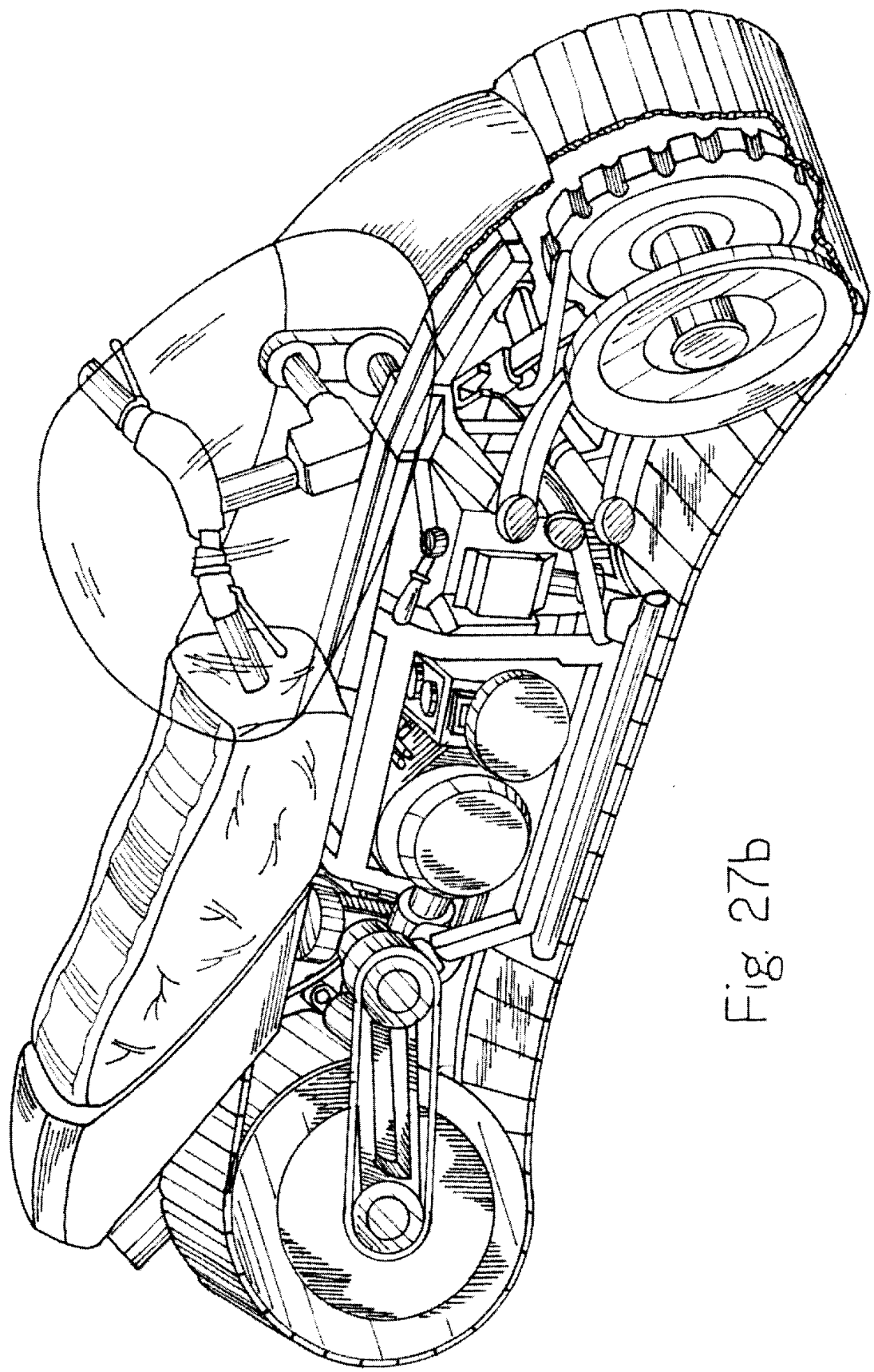

DYNAMICALLY STEERABLE MONO BELT APPARATUS

CROSS-REFERENCE TO RELATED APPLICATION

This patent application claims the benefit of U.S. Provisional Application Ser. No. 60/187,374, filed Mar. 6, 2000.

BACKGROUND OF THE INVENTION

1. Field of the Invention

The present invention relates generally to a continuous belt apparatus, and, in particular, to a dynamically steerable mono belt apparatus.

2. Description of the Prior Art

In the field of continuous belt technology, there are many different applications for such belts or treads, ranging from conveying systems through vehicular or locomotion systems. In the area of locomotion systems, typically two of such singular tread systems are used as the means for transporting the vehicle from one point to another, for example a military tank or a snowmobile. In all cases, two or more tread systems are used for both stability and steering. The use of these dual tread locomotion systems vastly decreases the steering and handling capability of the vehicle, due to their use of skid-steering to change direction, which causes large contact-patch friction, leading to power inefficiencies and is the root cause of treads being thrown.

Singular belt systems capable of taking turns are also used in the conveyor and materials handling industries. Typically, a simple chain with widened pins is used to hold snap-on slats that are either interleaving or overlapping, and provide for flexibility while being guided underneath, at the center and at both edges. Some of these slats may have ball bearings to reduce rolling friction while loaded. However, typically these conveyor systems support and guide the conveyor at its edges, and more importantly, these conveyors are preshaped and immovable. Still further, these prior art conveyor systems use a belt or tread material that is made of separate, connectable sections.

SUMMARY OF THE INVENTION

It is, therefore, an object of the present invention to provide a dynamically steerable mono belt apparatus that overcomes the deficiencies of the prior art. It is another object of the present invention to provide a dynamically steerable mono belt apparatus with a continuous and flexible belt that allows a user to "steer" the apparatus. It is yet another object of the present invention to provide a dynamically steerable tread apparatus that is equally useful in both the locomotive industry, as well as the materials handling industry.

Accordingly, we have invented a dynamically steerable mono belt apparatus which includes a first pivotable body element in communication with a second pivotable body element. Attached to and positioned between the first pivotable body element and the second pivotable body element is a first pivot mechanism. This first pivot mechanism allows the first pivotable body element to pivot in a first pivot plane of movement with respect to the pivotable body element. The present invention also includes a continuous belt element formed as a loop and continuously rotatable in a first plane of rotation around the first pivotable body element, the first pivot mechanism and the second pivotable body element. This continuous belt element is flexible in the pivot plane of movement.

In operation, when the first pivotable body element is pivoted via the first pivot mechanism, in the pivot plane of movement, the continuous belt element is flexed. When the continuous belt element is flexed, a second plane of rotation of the continuous belt element is created. In this manner, a user can "steer" the dynamically steerable mono belt apparatus.

The present invention, both as to its construction and its method of operation, together with additional objects and advantages thereof, will best be understood from the following description of specific embodiments when read in connection with the accompanying drawings.

BRIEF DESCRIPTION OF THE DRAWINGS

FIGS. 10a–c are top, perspective and edge views of the continuous belt element of FIG. 9;

FIG. 11 is a detailed perspective view of a drive spine with a plurality of engagement elements according to the invention;

FIGS. 12a–b are perspective views of the embodiment of FIG. 2 with the continuous belt element removed;

FIG. 13 is a perspective view of the embodiment of FIG. 2;

FIG. 14 is a perspective view of a guide spine according to the present invention;

FIG. 16b is an exploded perspective view of the embodiment of FIG. 16a;

FIGS. 27a–c are perspective views of internal design and components of the vehicle concept of FIG. 26.

DETAILED DESCRIPTION OF THE PREFERRED EMBODIMENTS

Figure 1:
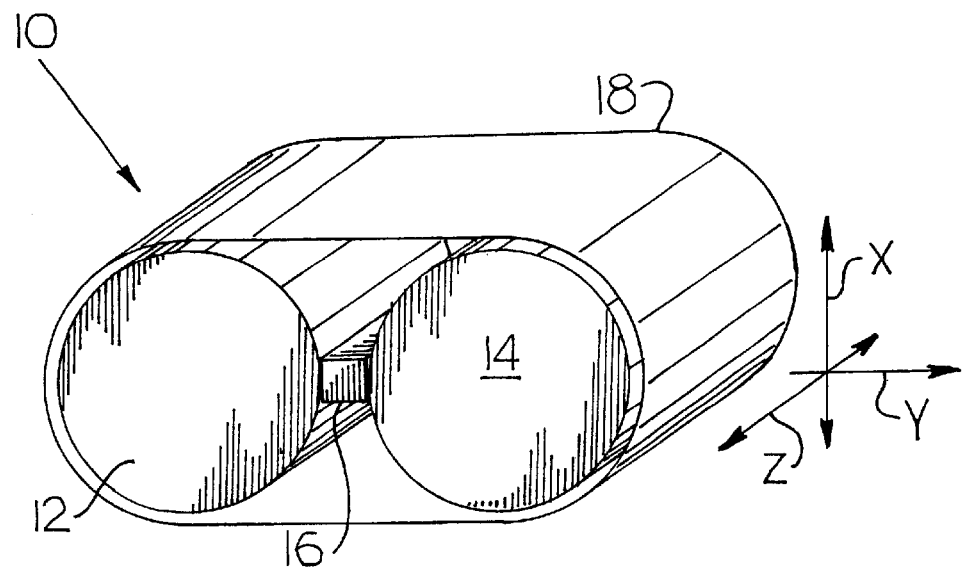
FIG. 1 is a perspective schematic view of a first embodiment of a dynamically steerable mono belt apparatus according to the present invention.
Figure 16A:
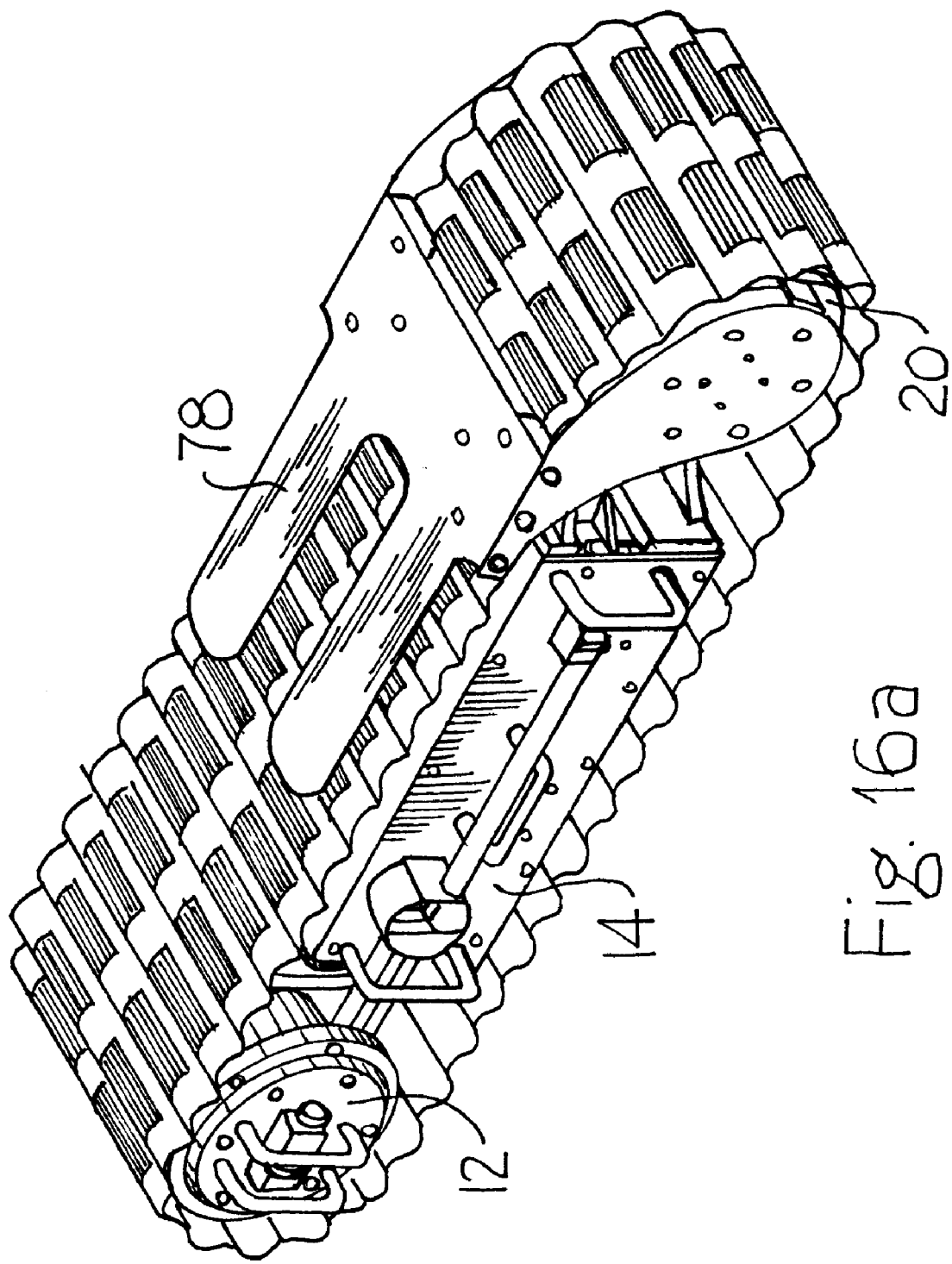
FIG. 16a is a perspective view of a further embodiment according to the present invention.
Figure 16B:
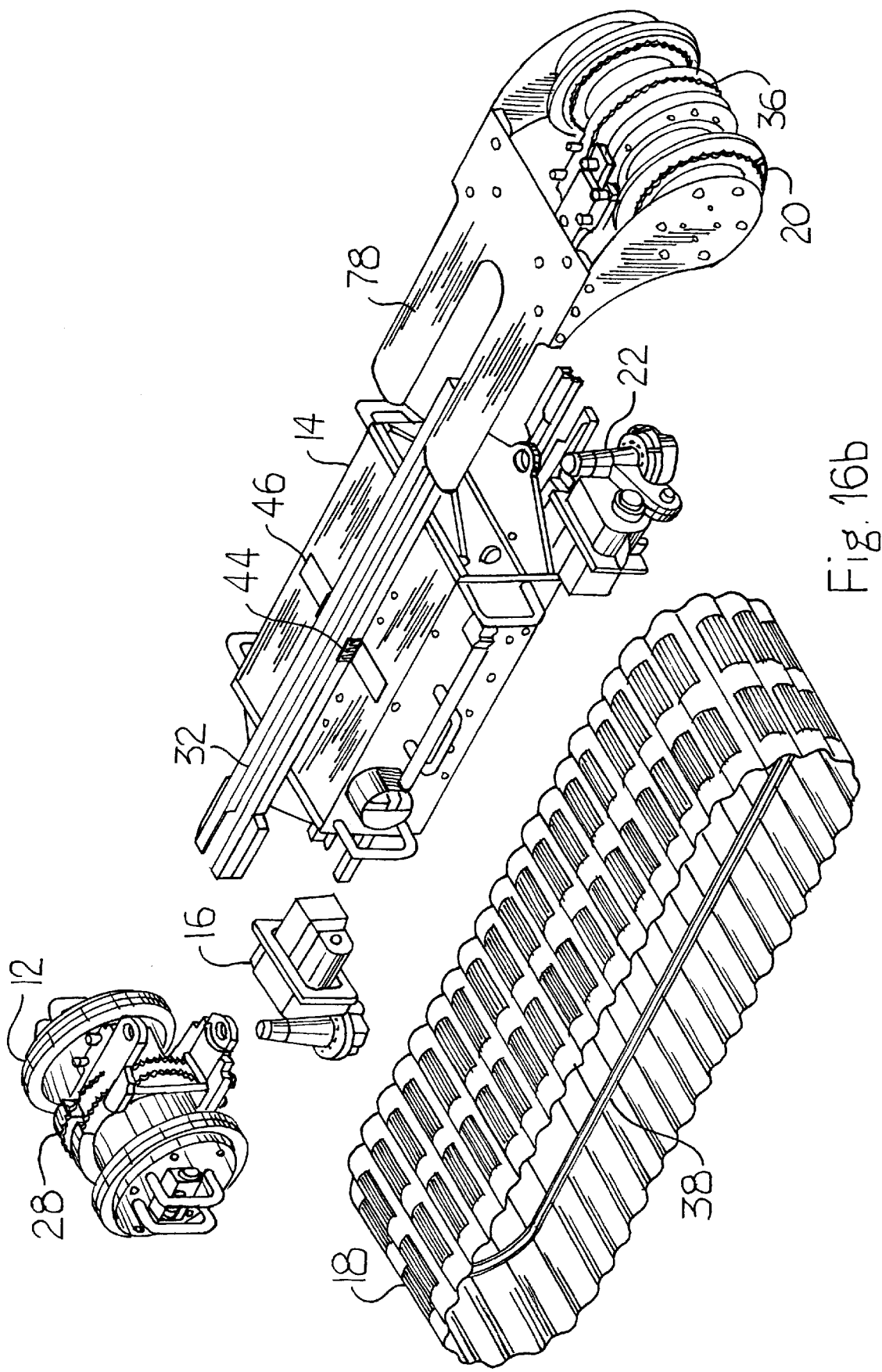

The present invention is a dynamically steerable mono belt apparatus 10, as shown in FIGS. 1–27. A first embodiment of the present invention, shown in FIG. 1, includes a first pivotable body element 12 in communication with a second pivotable body element 14. Positioned between and attached to both the first pivotable body element 12 and the second pivotable body element 14 is a first pivot mechanism 16. This first pivot mechanism 16 allows the first pivotable body element 12 to pivot in a first pivot plane of movement, represented by arrows Y and Z, with respect to the second pivotable body element 14. The pivot mechanism 16 may include a single pivot pin defining a single pivot axis such as best shown in FIG. 16b or multiple pivot pins about distinct pivot axes, or a universal type joint between the first pivotable body element 12 and the second pivotable body element 14. A variety of specific pivoting type mechanisms may be used. A continuous belt element 18, which is formed as a loop, is continuously rotatable in a first plane of rotation described by arrows X and Y. The continuous belt element 18 rotates around the first pivotable body element 12, the first pivot mechanism 16 and the second pivotable body element 14. In addition, the continuous belt element 18 is flexible in the pivot plane of movement YZ (perpendicular to the plane of rotation XY).

When the first pivot mechanism 16 is activated, it pivots the first pivotable body element 12 in the pivot plane of movement YZ (left and right movement). When the first pivotable body element 12 is pivoted in the YZ plane, the continuous belt element 18 is flexed, and the first pivotable body element 12, together with the continuous belt element 18, is now extending into a second distinct plane of rotation XY, thereby allowing the apparatus 10 to be steered or turned.

The dynamically steerable mono belt apparatus 10 can also pivot in a pivot plane of movement which is parallel (upward and downward movement) to either the first plane of rotation or the second plane of rotation as described above. In this manner, the first pivot mechanism 16 may allow the first pivotable body element 12 to be pivoted in a pivot plane of movement that is either perpendicular or parallel to the plane of rotation XY providing a full range of movement options. Simply, the dynamically steerable mono belt apparatus 10 has the ability to pivot the first pivotable body element 12 left, right, up and down with respect to the first plane of rotation XY and any subsequent plane of rotation.

One important aspect of the present invention is the ability of the continuous belt element to be dynamically flexible allowing it to be configured at will in the aforementioned ways or directions, yet capturable, in order to configure itself into and retain any number of shapes, which will generate curves in the continuous belt element 18. To further enhance the steerable ability of the dynamically steerable mono belt apparatus 10, multiple pivot points are envisioned.

Figure 2:
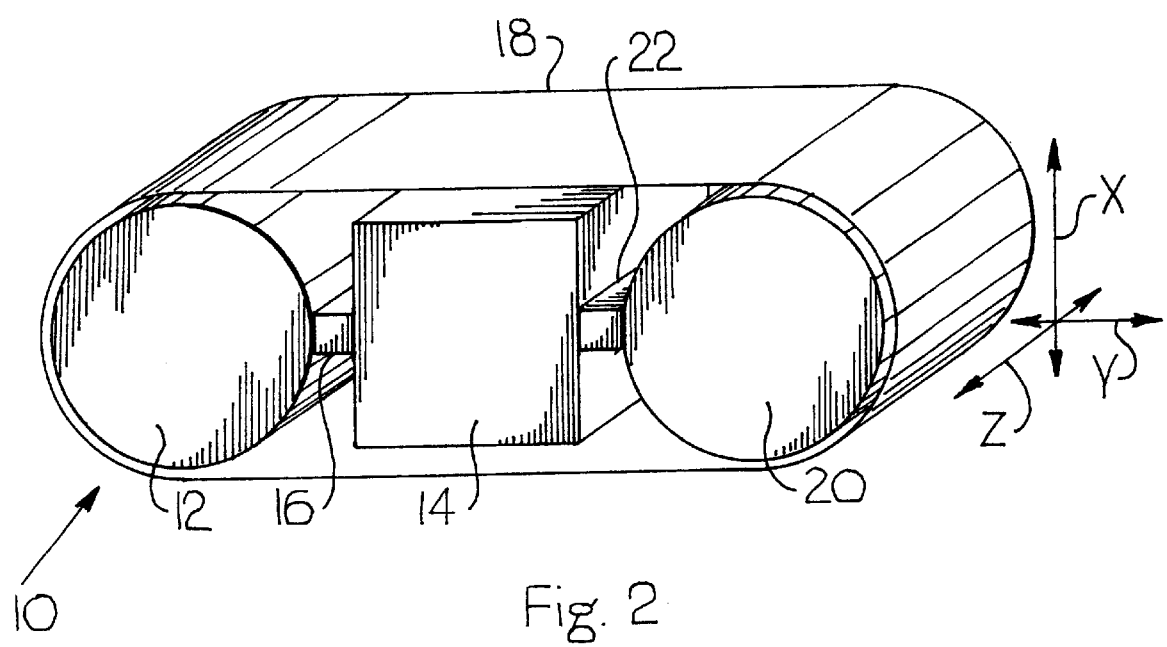
FIG. 2 is a perspective schematic view of a second embodiment of a dynamically steerable mono belt apparatus according to the present invention.
Figure 3:
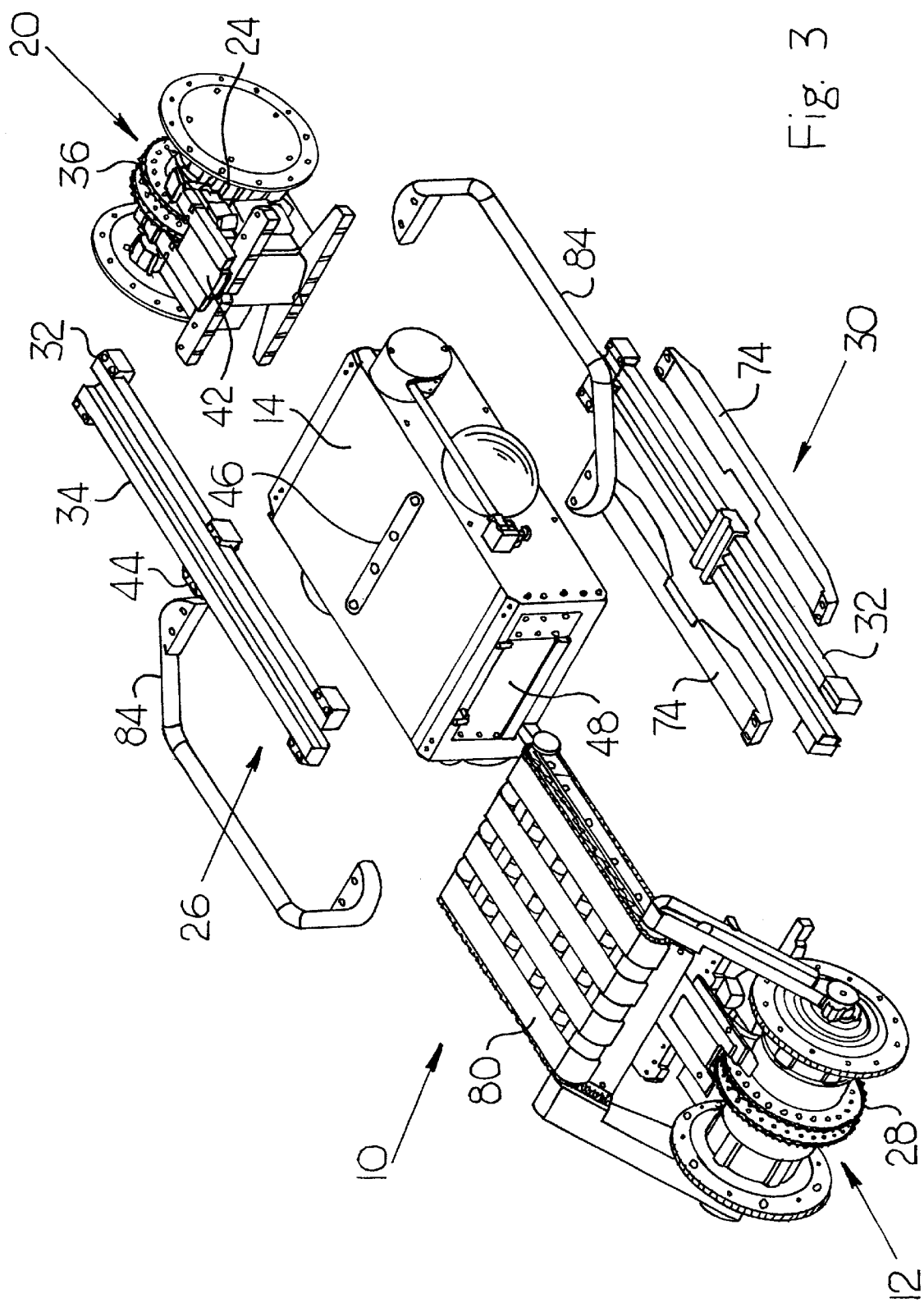
FIG. 3 is an exploded perspective view of the embodiment of FIG. 2 with various attachments.
Figure 4:
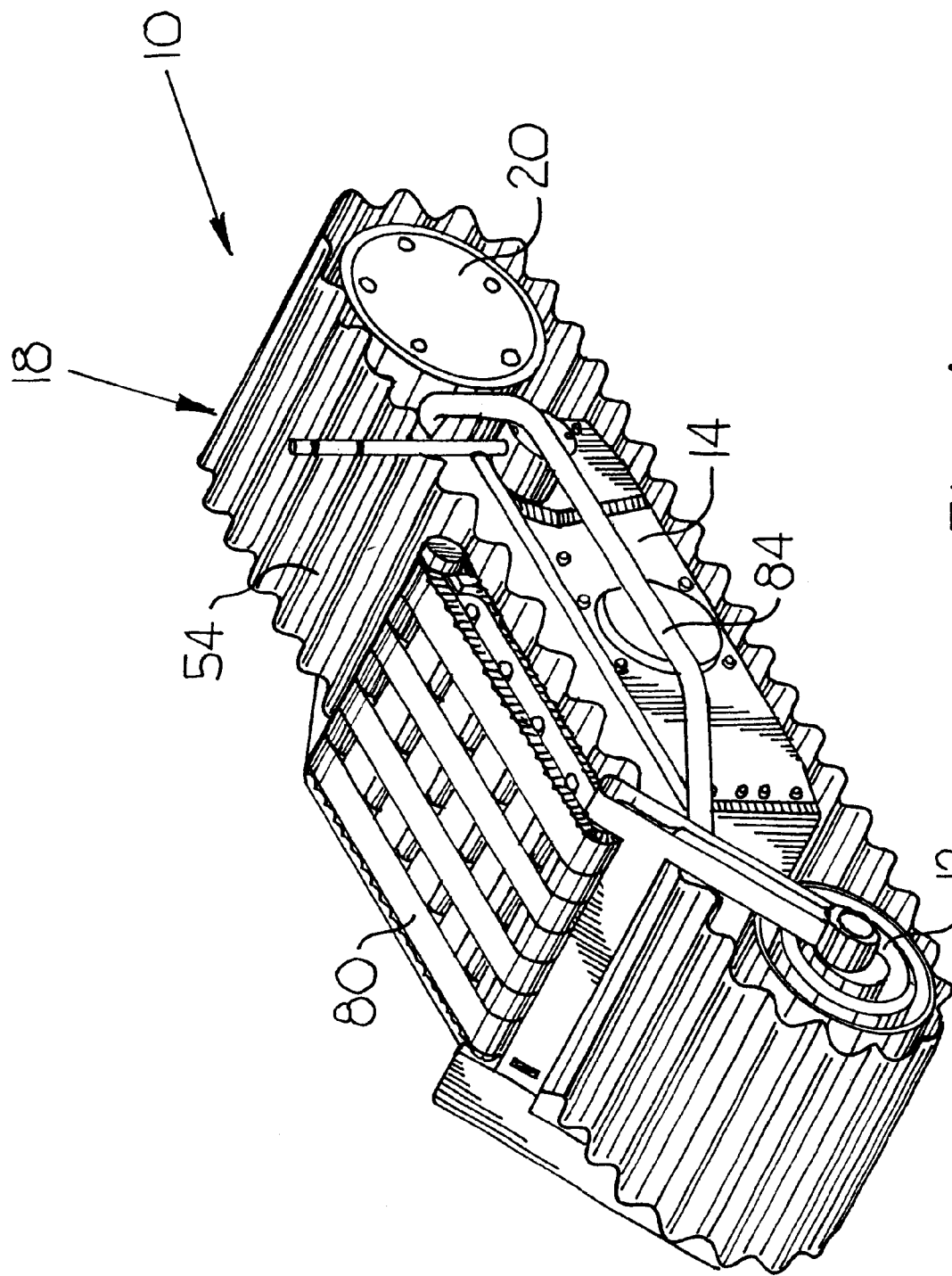
FIG. 4 is a perspective view of the embodiment of FIG. 2 with a paddle attachment.

As seen in FIGS. 2 and 3, a second embodiment according to the present invention adds a third pivotable body element 20. Further, the second embodiment includes a second pivot mechanism 22 attached to and positioned between the second pivotable body element 14 and the third pivotable body element 20. The second pivot mechanism 22 allows the third pivotable body element 20 to pivot in a second pivot plane of movement, with respect to the second pivotable body element 14. As discussed in connection with the first embodiment, in the second embodiment, the continuous belt element 18 is continuously rotatable in a first plane of rotation XY around the first pivotable body element 12, the second pivotable body element 14 and the third pivotable body element 20, as well as both the first pivot mechanism 16 and the second pivot mechanism 22. As before, this continuous belt element 18 is flexible in the second pivot plane of movement. As with the first pivot mechanism 16, the second pivot mechanism 22 may allow the third pivotable body element 20 to be pivoted in a pivot plane of movement that is either perpendicular or parallel to the plane of rotation XY.

The first pivotable body element 12 and the third pivotable body element 20, while possibly being controlled by, e.g., mechanical linkage or electrical synchronization, a single control unit, are independent of each other. This allows the present invention to take on shapes that other vehicles cannot. For example, the present invention can have the first pivotable body element 12 steer left or right and/or up and down, while the third pivotable body element 20 stays straight, or vice versa.

Figure 5A:
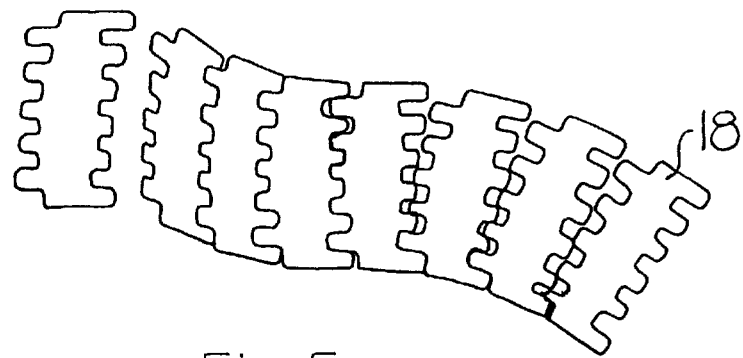
FIGS. 5a–e are views of various continuous belt element designs according to the present invention.
Figure 5B:
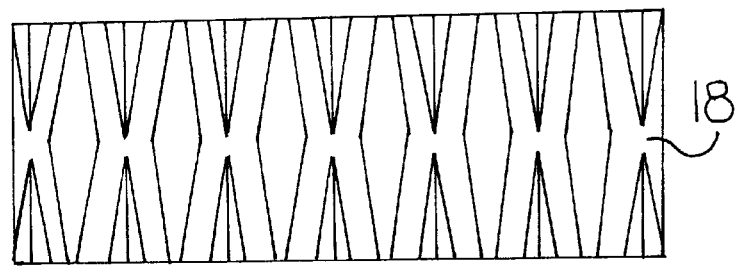
Figure 5C:
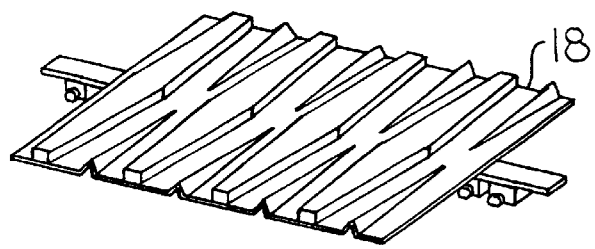
Figure 5D:
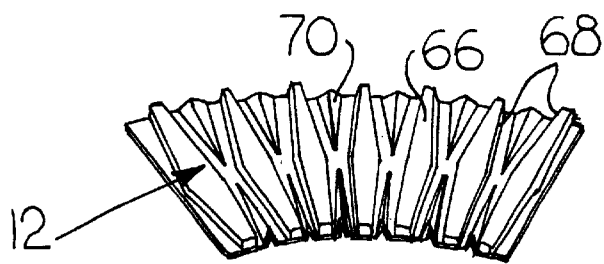
Figure 5E:
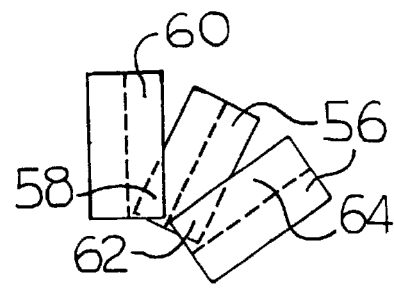
Figure 6:
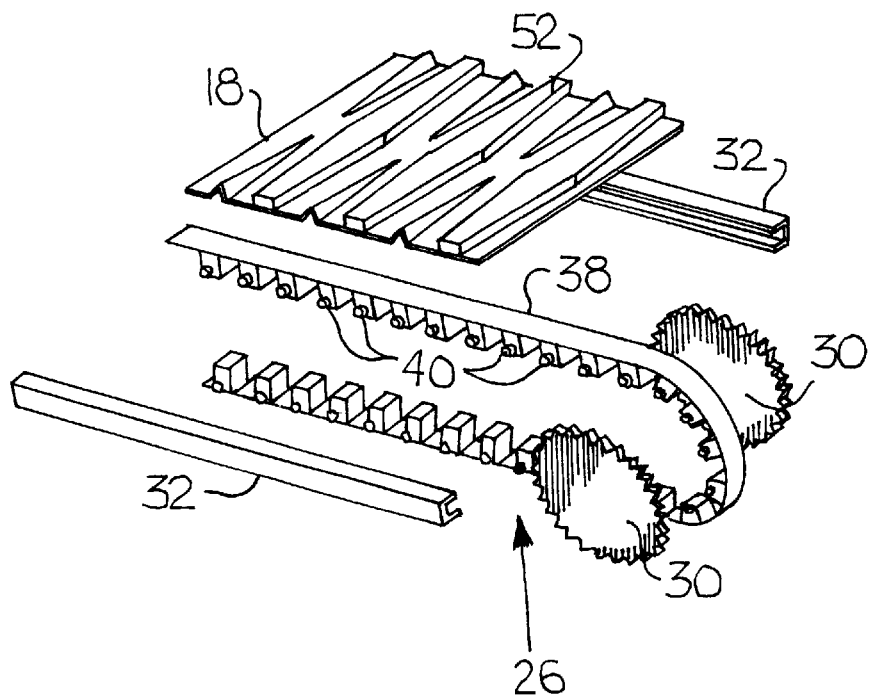
FIG. 6 is an exploded perspective view of various components of the dynamically steerable mono belt apparatus according to the present invention.
Figure 7:
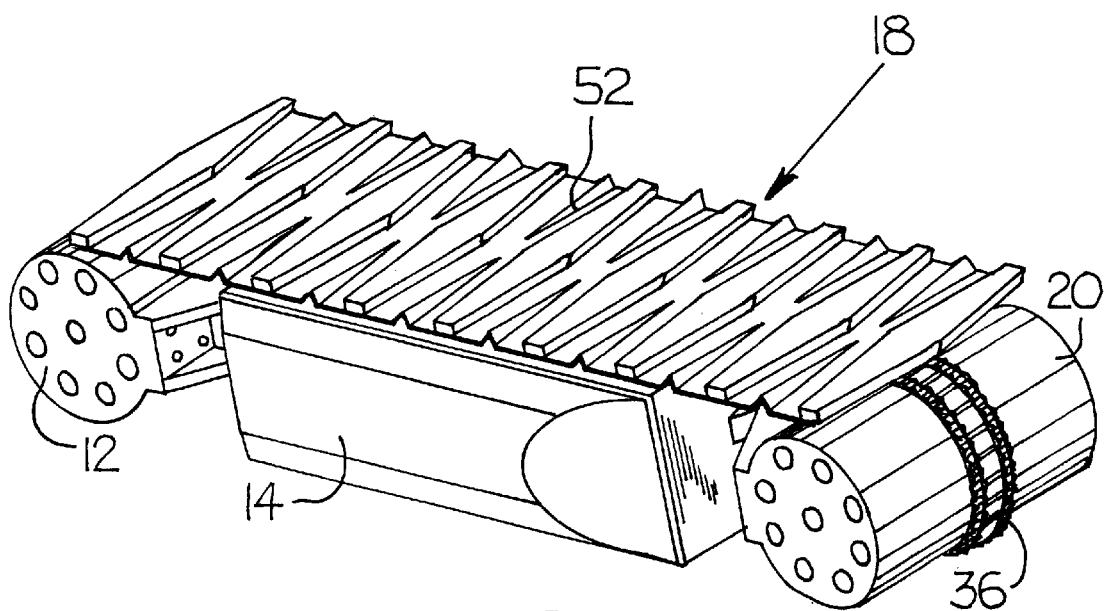
FIG. 7 is a perspective view of the embodiment of FIG. 2 with a continuous belt element partially removed.
Figure 25:
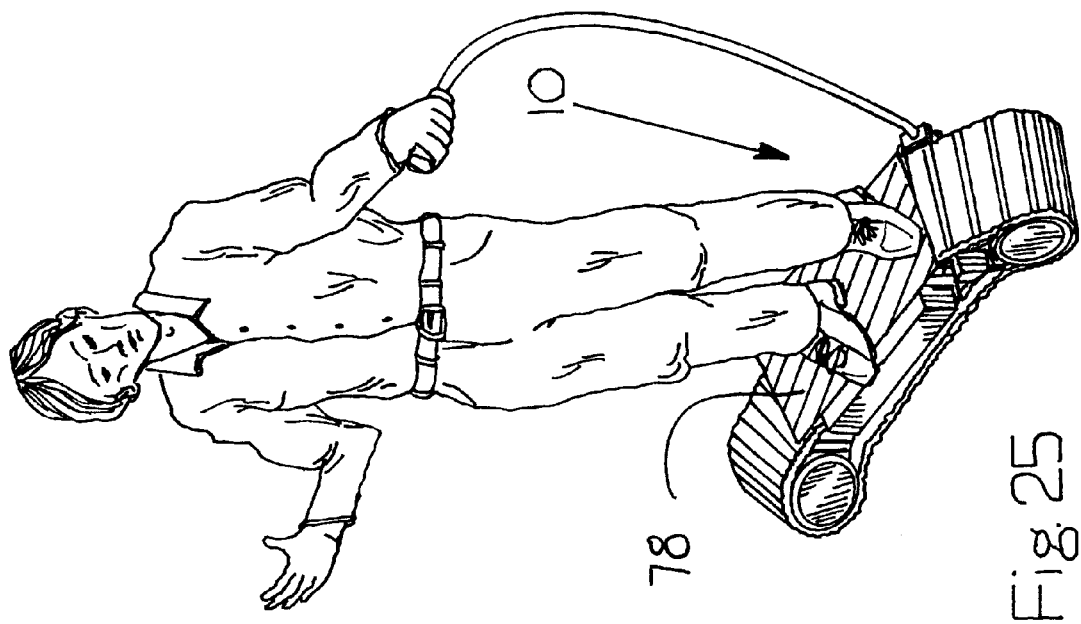
FIG. 25 is a perspective view of a stand-on tread concept according to the present invention.

The planar movements of the apparatus 10 of the present invention demonstrate that the first pivotable body element 12 could steer one direction, while others, such as the third pivotable body element 20, steer in opposite directions, which would allow the apparatus 10 to assume an essentially curved shape. The apparatus 10 can also force the third pivotable element 20 to steer in the same direction, making the apparatus 10 appear in an S-shape. There are endless permutations that the apparatus 10 of the present invention can attain that prior art devices cannot. It is this independent pivoting functionality that allows the apparatus 10 of the present invention to attain new and novel shapes, variations and accompanying functionality. An example of this novel functionality is illustrated in FIGS. 5a, 25 and 27b.

In adding the third pivotable body element 20 and the second pivot mechanism 22, the dynamically steerable mono belt apparatus 10 of the present invention has even greater flexibility and range of movement, whether used in the materials handling industry or the vehicle industry.

It is important in both embodiments that the continuous belt element 18 be able to rotate around the pivotable body elements 12, 14 and/or 20 with nominal friction while retaining its given shape. The pivotable body elements 12, 14 and/or 20 remain oriented in series while the continuous belt element 18 rotates around them, thereby moving the apparatus 10 in the plane of rotation XY. As discussed above, the plane of rotation XY may be changed to steer the apparatus 10.

A drive mechanism may be attached to or integral with any of the pivotable body elements 12, 14 or 20. The drive mechanism 24 drives the continuous belt element 18, as well as the first pivot mechanism 16 and/or the second pivot mechanism 22. The drive mechanism 24 is powered by a power source, such as a combustible fuel engine, a rechargeable battery, a primary battery, a solar cell and/or a chemical reaction engine.

In order to allow the continuous belt element 18 to rotate around the pivotable body elements 12, 14 and/or 20, yet remain captured, so as not to become displaced but rather to retain the optimal shape for steering or lifting, a rotation system 26 is utilized. The rotation system 26 is used to rotatably secure the continuous belt element 18 to the pivotable body elements 12, 14 and/or 20.

The rotation system 26 includes; a first pivotable body element engaging mechanism 28 attached to the first pivotable body element 12, which is rotatable in the first plane of rotation XY, and a second pivotable body element engaging mechanism 30 attached to the second pivotable body element 14, also rotatable in the first plane of rotation XY. In addition, either one of first pivotable body element engaging mechanism 28 and the second pivotable body element engaging mechanism 30 can be a single or set of guide spines 32 attached to the respective first pivotable body element 12 or the second pivotable body element 14. When using the third pivotable body element 20, a third pivotable body element engaging mechanism 36 may be utilized. In this situation, it is the second pivotable body element engaging mechanism 30 that comprises the at least one guide spine 32. The pivotable body element engaging mechanisms 28, 30 and 36, and the guide spine 32, are all equipped to capture and hold the continuous shape of belt element 18.

A drive spine 38 may be attached to and extend from an inner surface of the continuous belt element 18. The drive spine 38 can have multiple engagement elements 40 attached to and extending away from the drive spine 38, e.g., pins, timing belt teeth, etc. These engagement elements 40 are engageable with the pivotable body element engaging mechanisms 28, 30 and/or 36, as well as with the guide spine 32, shown in FIG. 16*b*. In order to engage the engagement elements 40, the guide spine 32 may have guide spine slots 34 extending internally and longitudinally within the guide spine 32. The drive spine 38 may also be integrally formed with the continuous belt element 18.

In operation, when the continuous belt element 18 with the drive spine 38 is placed around the pivotable body elements 12, 14 and/or 20, the engagement elements 40 of the drive spine 38 engage the pivotable body element engaging mechanisms 28, 30 and/or 36 and the guide spine slots 34. This engagement serves to capture the continuous belt element 18 to the pivotable body elements 12, 14 and/or 20, yet still allow rotation around these elements. When the continuous belt element 18 is rotated in the first plane of rotation XY, the engagement elements 40 of the drive spine 38 are engaged by the pivotable body element engaging mechanisms 28, 30 and/or 36 thereby continuously rotating the continuous belt element 18 in the first plane of rotation XY. When the first pivot mechanism 16 or second pivot mechanism 22 is pivoted in the first pivot plane of movement or the second pivot plane of movement, the engagement elements 40 of the drive spine 38 are engaged and the continuous belt element 18 is flexed, thereby creating subsequent planes of rotation of the continuous belt element 18. When using the third pivotable body element 20, the second pivotable body element engaging mechanism 30 may comprise the guide spine 32.

The drive spine 38 is a single circumferential element placed centrally and extending around the continuous belt element 18, and may be placed in any number of locations on the continuous belt element 18. The drive spine 38 may be a chain-link, or a shaped internal-tooth timing-belt or a continuous elastomeric element, with embedded strength wire or rope. When powered, the pivotable body element engagement mechanisms 28, 30 and/or 36 impart motion to the drive spine 38, which is attached to the continuous belt element 18. Next, the continuous belt element 18 moves with respect to a surface, causing motion in the presence of friction. It is envisioned that the engaging elements 40 can be a set of protruding pins in a regularly-spaced pattern of protruding timing-belt teeth along the drive spine 38, and that the pivotable body element engaging mechanisms 28, 30 and/or 36 are each a set of dual sprockets, which engage the pins and/or the timing-belt teeth, thereby advancing the drive spine 38. Similar effects could be generated by using toothed pulleys or other sprocket arrangements which would engage the drive spine 38 at its timing-belt teeth and impart motion thereto.

While the use of a guide spine 32 may be unnecessary in the first embodiment, the guide spine 32 use is preferable in the second embodiment, where the third pivotable body element 20 and the second pivot mechanism 22 are included. As discussed previously, in the second embodiment, the second pivotable body element engaging mechanism 30 is replaced by the guide spine 32, since the third pivotable body element 20 has a third pivotable body element engaging mechanism 36. When using the guide spine 32, it is preferable to locate one mutually opposable set of guide spines 32 on one side of the second pivotable body element 14, and a second mutually opposable set of guide spines 32 on the other side of the second pivotable body element 14. The use of multiple sets of guide spines 32 will assist in capturing and maintaining the shape of the continuous belt element 18. An example of this use of multiple sets of guide spines 32 is seen in FIG. 3.

In order to allow lateral and longitudinal movement, the guide spine 32 may be flexible, while still allowing the engagement elements 40 to move in a continuous path around the pivotable body element engaging mechanisms 28, 30 and/or 36 while the first pivot mechanism 16 and/or second pivot mechanism 22 are pivoted. However, when this flexible guide spine 32 is displaced, it must be capable of both longitudinal and lateral movement. In order to allow this movement, a guide spine longitudinal flex slot 42 may be attached to at least one of the pivotable body elements 12, 14 and/or 20. The guide spine longitudinal flex slot 42 is configured to accept one end of the guide spine 32 (or a longitudinal guide element 43), such that, when the guide spine 32 is flexed, the end of the guide spine 32 (or longitudinal guide element 43) is longitudinally moveable along the guide spine longitudinal flex slot 42. Similarly, in order to allow lateral movement, a lateral guide element 44 is attached to the guide spine 32, preferably at a substantially central location on the guide spine 32. In addition, a guide spine lateral flex slot 46 is attached to one of the pivotable body elements 12, 14 and/or 20. The guide spine lateral flex slot 46 accepts the lateral guide element 44 on the guide spine 32 such that, when the guide spine 32 is flexed, the lateral guide element 44 is laterally moveable along the guide spine lateral flex slot 46. When multiple guide spines 32 are used, multiple guide spine longitudinal flex slots 42 may be used.

The ability to bend the guide spine 32, in order to cause the continuous belt element 18 to take on a substantially curved shape, relies on the ability to deform and maintain the deformation of the guide spine 32, which, when attached to the continuous belt element 18, will cause the entire continuous belt element 18 to deform. This action can be implemented as discussed above or in any other number of ways. The important aspect is to ensure shape retention and minimize or avoid throwing the continuous belt element 18 (defined as causing the engagement elements 40 to lose contact with the engaging mechanisms 28, 30 and/or 36, thereby causing the continuous belt element 18 to stop rotating). It is this key that led to the development of the above-discussed flexible guide spine 32, which literally traps the drive spine 38, or any element attached to it, in a continuous geometric feature that disallows the drive spine 38 from assuming any other shape than the one imposed by the guide spine 32. Reducing the friction between the guide spine 32 and the drive spine 38 (or any other contacting elements) using anti-friction elements or low-friction materials guarantees continuous travel and rotation of the drive spine 38, without the penalty of excessive power dissipation and material wear. In a preferred embodiment, the drive spine 38 is a plastic material embedded with a friction-reducing material (such as Teflon@), with the engagement elements (simple pins) embedded in the reinforced elastomeric drive spine 38. There are many ways to achieve this behavior.

The guide spine 32, and the material of construction of the guide spine 32, together with its interaction with the drive spine 38, will allow the shaping of the continuous belt element 18 in the horizontal plane, thereby allowing left and right motions of the dynamically steerable mono belt apparatus 10. However, this guide spine 32/drive spine 38 interaction also allows the continuous belt element 18 to securely move it in upward and downward directions, without losing its ability to shape and retain the continuous belt element 18. Since the drive spine 38, and its connected continuous belt element 18, are fully captured by the guide spine 32, the need to provide proper continuous belt element 18 tension is obviated, allowing one to simply mount and dimensionally place the continuous belt element 18 with a fixed length dimension, without lowering drive efficiencies due to preloading. Further, the continuous belt element 18 travels over the rounded pivotable body elements 12, 14 and/or 20 without any lateral or vertical deformation, such that the drive spine 38 is trapped by the guide spine 32, further reducing the possibility of throwing the continuous belt element 18.

The dynamically steerable mono belt apparatus 10 may also include a control system 48 located within any one of the pivotable body elements 12, 14 and/or 20. A control system 48 controls the functioning of the dynamically steerable mono belt apparatus 10 in response to externally- or internally-generated commands. In addition, the control system 48 may control the speed, heading and all other possible functions occurring aboard the dynamically steerable mono belt apparatus 10 and may be implemented by way of an on- or off-board computer or other tethered or wireless interface. For example, the control system 48 may allow for a user to communicate with the control system 48, thereby manually controlling the drive and steering and other functions of the dynamically steerable mono belt apparatus 10. In this manner, remote control or even autonomous control is envisioned.

In order to increase the functionality of the dynamically steerable mono belt apparatus 10, a steering mechanism 50 may be provided, such that the steering mechanism 50 communicates with the first pivot mechanism 16 and/or the second pivot mechanism 22. Either manually or using the control system 48, a user utilizes the steering mechanism 50 to pivot the first pivot mechanism 16 and/or the second pivot mechanism 22 along the first or second pivot plane of movement or any subsequent plane of rotation. In operation, the change in heading of the dynamically steerable mono belt apparatus 10 occurs when the guide spine 32 is reshaped through the application of torque or other force. This bending may be accomplished by bending both ends of the guide spine 32 (holding one end steady and bending the other end of the guide spine 32) or applying a force centrally while fixing both ends of the guide spine 32. The guide spine 32 may be bent by the application and transferring of torque through the guide spine longitudinal flex slot 42 and the guide spine lateral flex slot 46. This torque may be created by the drive mechanism 24 or applied through force amplification from a human motion (arm or leg). As discussed previously, in a preferred embodiment, the guide spine 32 is provided with lateral movement via the lateral guide element 44/guide spine lateral flex slot 46 combination. Additionally, the guide spine 32 is provided with longitudinal movement via the longitudinal guide element 43/guide spine longitudinal flex slot 42 combination. Both the guide spine longitudinal flex slot 42 and the guide spine lateral flex slot 46 may be constructed as dovetail grooves, with the ends of the guide spine 32 (or the longitudinal guide element 43) and the lateral guide element 44 manufactured as a dovetail. As stated above, the guide spine 32 may, in certain embodiments, be flexible to provide for a full range of motion. The supporting structure, of course, must be designed to accommodate the expected motion.

As seen in FIGS. 5a–d, the continuous belt element 18 may include gripping elements 52 attached to and extending away from an outer surface of the continuous belt element 18, creating a tread-like structure. The gripping elements 52 provide traction between the continuous belt element 18 and the surface upon which it rides, if used in such an application. These gripping elements 52 allow the dynamically steerable mono belt apparatus 10 to be an all-terrain vehicle.

Figure 9A:
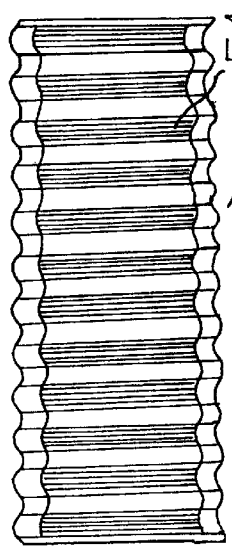
FIGS. 9a–b are perspective views of a continuous belt element according to the invention formed as a continuous surface-webbing elastomeric-based material.
Figure 9B:
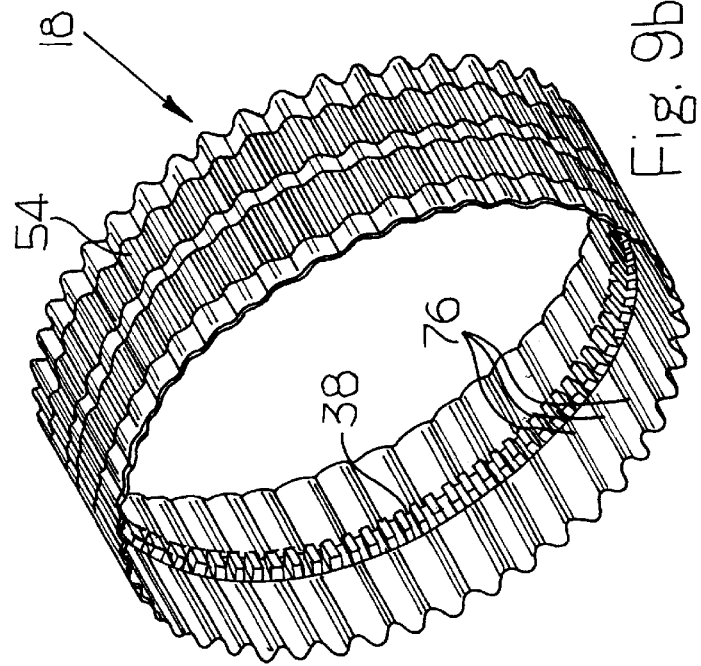
Figure 8A:
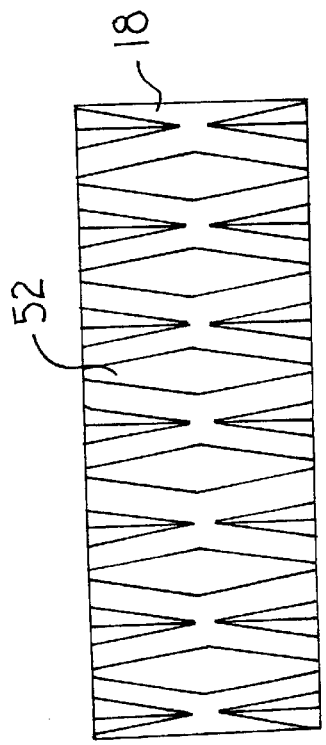
FIGS. 8a–c are perspective views of various continuous belt element designs according to the present invention.
Figure 8B:
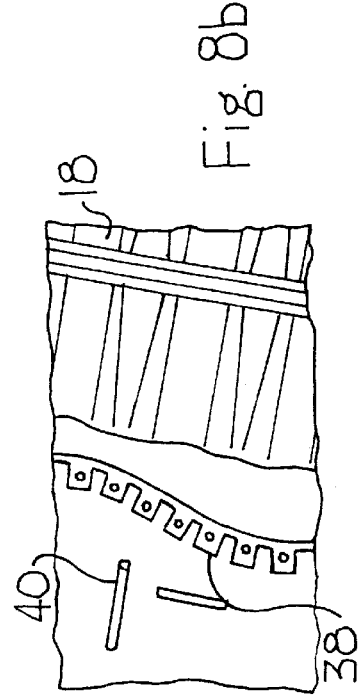
Figure 8C:
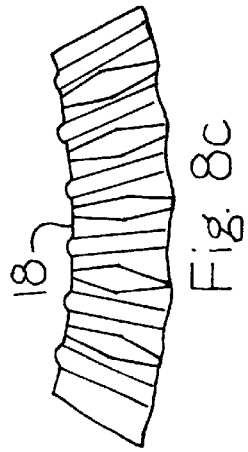
Figure 15:
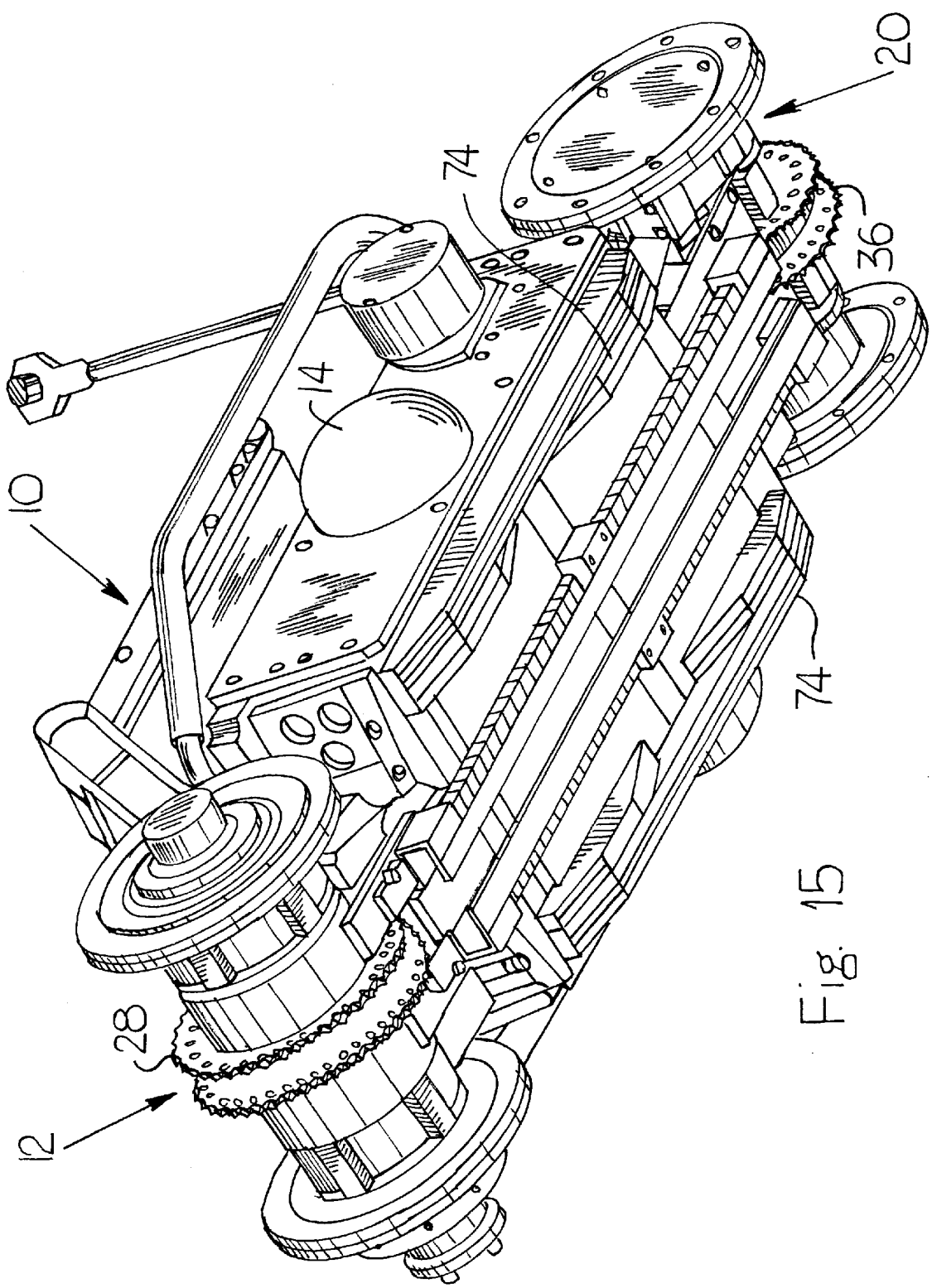
FIG. 15 is a perspective view of an embodiment of FIG. 2 with sliding-surface body-bogies and with the continuous belt element removed.

As an important feature of the present invention is the flexible continuous belt element 18, many different arrangements are envisioned to achieve this flexible, yet continuous, belt element 18. In a preferred embodiment the continuous belt element 18 is a continuous surface-webbing elastomeric-based material, as seen in Figs. 10a–c. In this embodiment of the continuous belt element 18, the continuous surface-webbing elastomeric-based material is provided with flex ribbing 54 such that, when the continuous belt element 18 is flexed, the flex ribbing 54 expands and compresses to allow the continuous belt element 18 to bend (as shown in FIG. 9), but remain continuously flush to the surface upon which it rides. In this embodiment using the flex ribbing 54, these grouser-like thickened ridges are perpendicular to and evenly spaced along the length of the continuous belt element 18, connected into a seamless elastomeric continuous belt element 18 with thinner flex ribbing 54 positioned therebetween. This allows the continuous belt element 18 to bend in either direction, while the flex ribbing 54 bridges the gaps between the ridges evenly.

The continuous belt element 18 may also consist of multiple overlappable and adjacent plates 56. Such that when the plates 56 are turned, a first portion 58 of each plate 56 slides into a first plate recess 60 of the preceding plate 56, and a second portion 62 of each plate 56 slides into a second plate recess 64 of the succeeding plate, thereby allowing the continuous belt element 18 to continuously contact the surface.

In another embodiment of the continuous belt element 18, multiple gapped plates 66 having at least two gapped portions 68, such that when the gapped plates 66 are turned, the gapped portion 68 of one plate 66 abuts the adjacent gapped plate 66, thereby allowing the continuous belt element 18 to continuously contact the surface. In order to disallow material to enter the dynamically steerable mono belt apparatus 10 through the gapped portions 68, these gapped portions 68 may be bridged by a compliant material 70, so that when the gapped plates 66 are turned, the compliant material 70 of a gapped portion 68 collapses, still allowing the gapped portion 68 to abut the adjacent gapped plate 66. The range of movement of the compliant material 70 ensures continuous belt element 18 contact. Further, the compliant material 70 may be a cloth material, an elastomeric material, or any other suitable material allowing compression and expansion.

The dynamically steerable mono belt apparatus 10 may also include a frame 72 surrounding and supporting the pivotable body elements 12, 14 and/or 20. This frame 72 is useful to provide location and rigidity of the elements that make up the dynamically steerable mono belt apparatus 10. The frame 72 could be in the form of a welded or bolted tubular or plate structure, or in the form of a monocoque (whether cast in plastic or formed with fibrous resin-hardening material), where the housing or joined panel sections of the body create the rigid structure necessary.

It is also envisioned that a shock absorbing mechanism 74 is included. Suspension for the dynamically steerable mono belt apparatus 10 can be achieved in several ways. The pivotable body elements 12, 14 and/or 20 may be hinged and shock mounted to each other and/or to a frame 72 in a spring and dashpot arrangement. In addition, the shock absorbing mechanism 74 (note that this is primarily a low-friction element to reduce body-to-belt friction—it could also be a collection of wheeled rollers, like in a tank) may be built into the continuous belt element 18 or into a shock spring design. Such a shock spring design will use a low friction surface or a spring-loaded bogie arrangement on the underside of the pivotable body elements 12, 14 and/or 20, separating the pivotable body elements 12, 14 and/or 20 from the moving continuous belt element 18, which is in contact with the ground.

The dynamically steerable mono belt apparatus 10 may also include support ribs 76 attached to or integrally formed with the continuous belt element 18. The support ribs 76 are used to strengthen the continuous belt element 18 along its circumferential direction.

A platform 78 may also be attached to the pivotable body elements 12, 14 and/or 20 to allow an object to rest on the platform 78 above the continuous belt element 18. For example, the platform 78 may allow cameras, sensors, drop-off payloads, or even humans to be located on the platform 78 in a multitude of positions, turning the dynamically steerable mono belt apparatus 10 into a transportation medium for urban and off road terrains.

The dynamically steerable mono belt apparatus 10 may also include a paddle structure 80 attached to the pivotable body element 12, 14 and/or 20 that is on the end of the dynamically steerable mono belt apparatus 10. The paddle 80 should be adapted to extend away from and in front of the dynamically steerable mono belt apparatus 10, allowing it to ram the paddle 80 onto a step and climb it. If a set of passive or driven belts are added to the paddle 80, it could itself become a climbing-assistance device The dynamically steerable mono belt apparatus 10 is equally viable in both the vehicle, as well as the conveyor, industries. It is its ability to be controlled so as to achieve an almost infinite number of configurations in the left/right and up/down directions, yet maintain a continuous surface, that is a novel aspect of the present invention. In the materials handling industry, as opposed to using complicated ramping and prefabricated turning conveyor systems, the dynamically steerable mono belt apparatus 10 is both highly useful and adjustable. The apparatus 10 provides a dynamic adjustable conveyor.

Various other functioning equipment can be added to the dynamically steerable mono belt apparatus 10 to increase its usefulness. For example, encoders, resolvers, potentiometers, a compass, a global positioning system, gyro and accelerometers and other monitoring systems are envisioned. For example, a camera system 82 may use any available technology, such as a miniature black and white, color CCD or CMOS system. The camera system 82, and its various components, may be mounted so as to provide a view around and/or through the continuous belt element 18, or by way of a deployable mass that incorporates a pan and tilt head to allow the user to move the camera system 82 to point in any direction. The image captured by the camera system 82 can be sent directly over an analog RF-link to the operator, or frame-grabbed, digitized and digitally sent over a radio-modem/-ethernet to be digitally reconstructed off site.

The control system 48 can be configured in any one of numerous variations. The control system 48 may be an on-board computer system that receives low- and/or high-level commands, causing the dynamically steerable mono belt apparatus 10 to move. Further, using autonomous control software receiving data from on- and off-board sensory devices, the control system 48 may implement many different intelligent behaviors, making this system more robust to operational conditions and independent of real-time human control.

Figure 17:
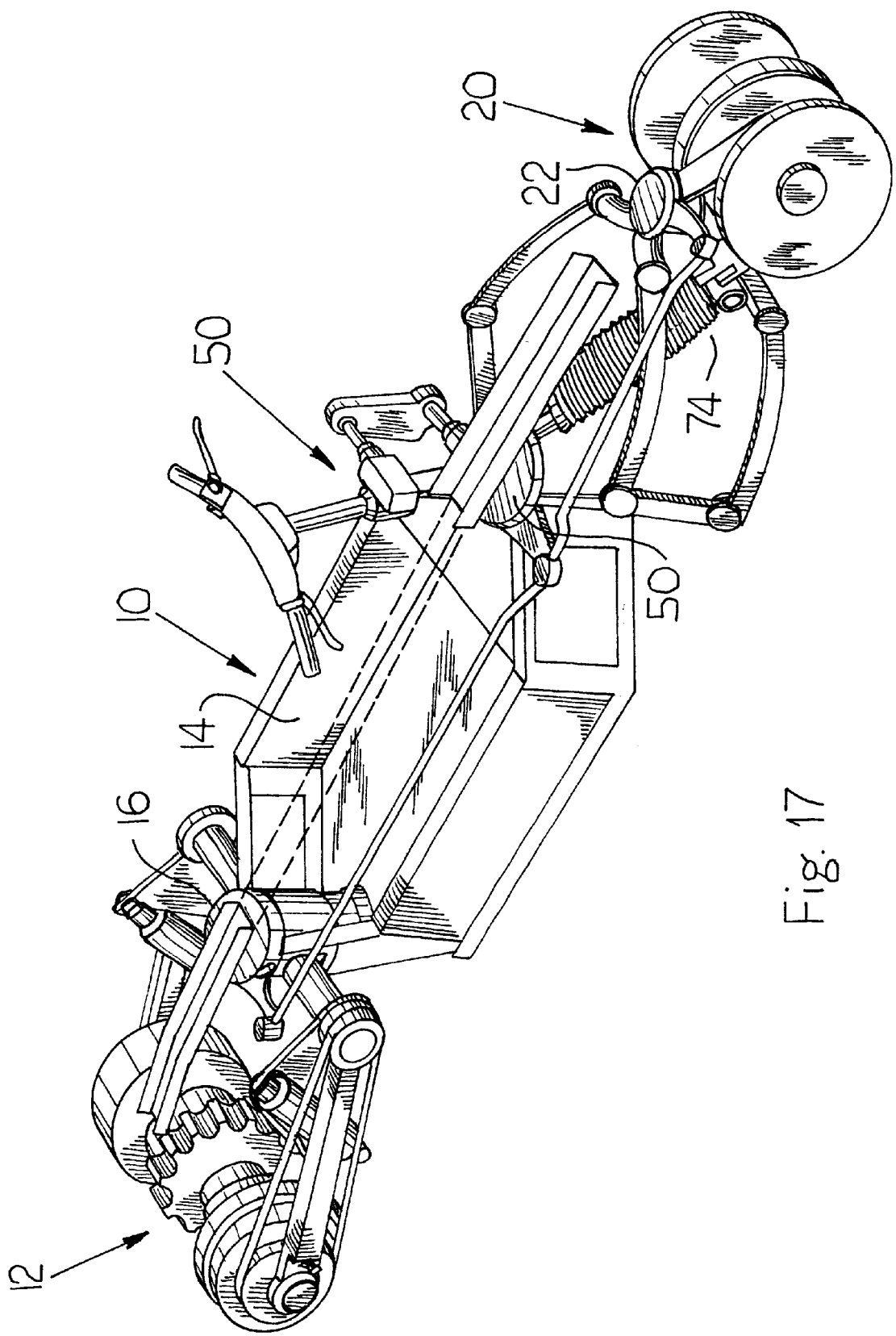
FIG. 17 are various perspective views of the embodiment of FIG. 2 with a manually-activated steering mechanism and with the continuous belt element removed.
Figure 18B:
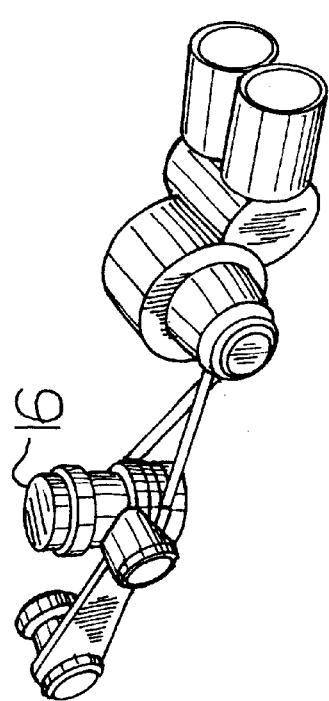
FIGS. 18a–d are perspective schematic representations of drive mechanism and steering mechanism design alternatives.
Figure 18D:
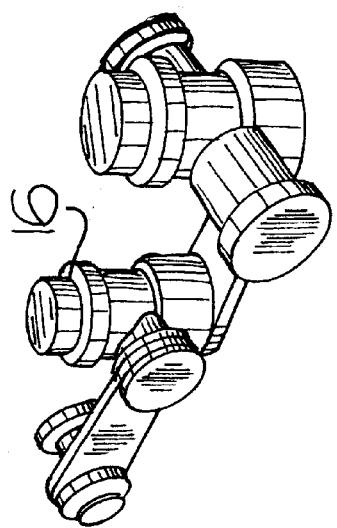
Figure 18A:
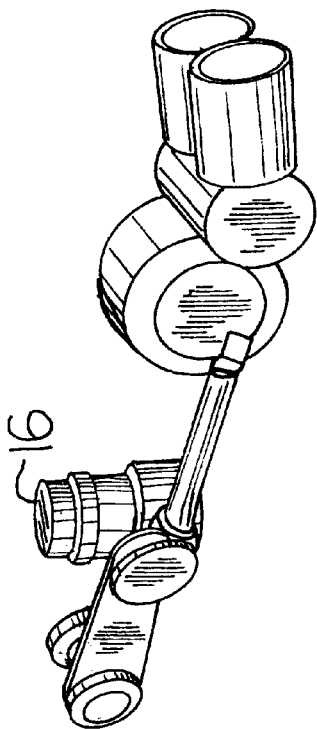
Figure 18C:
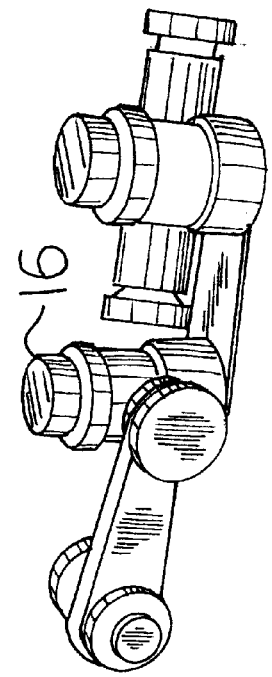
Figure 19A:
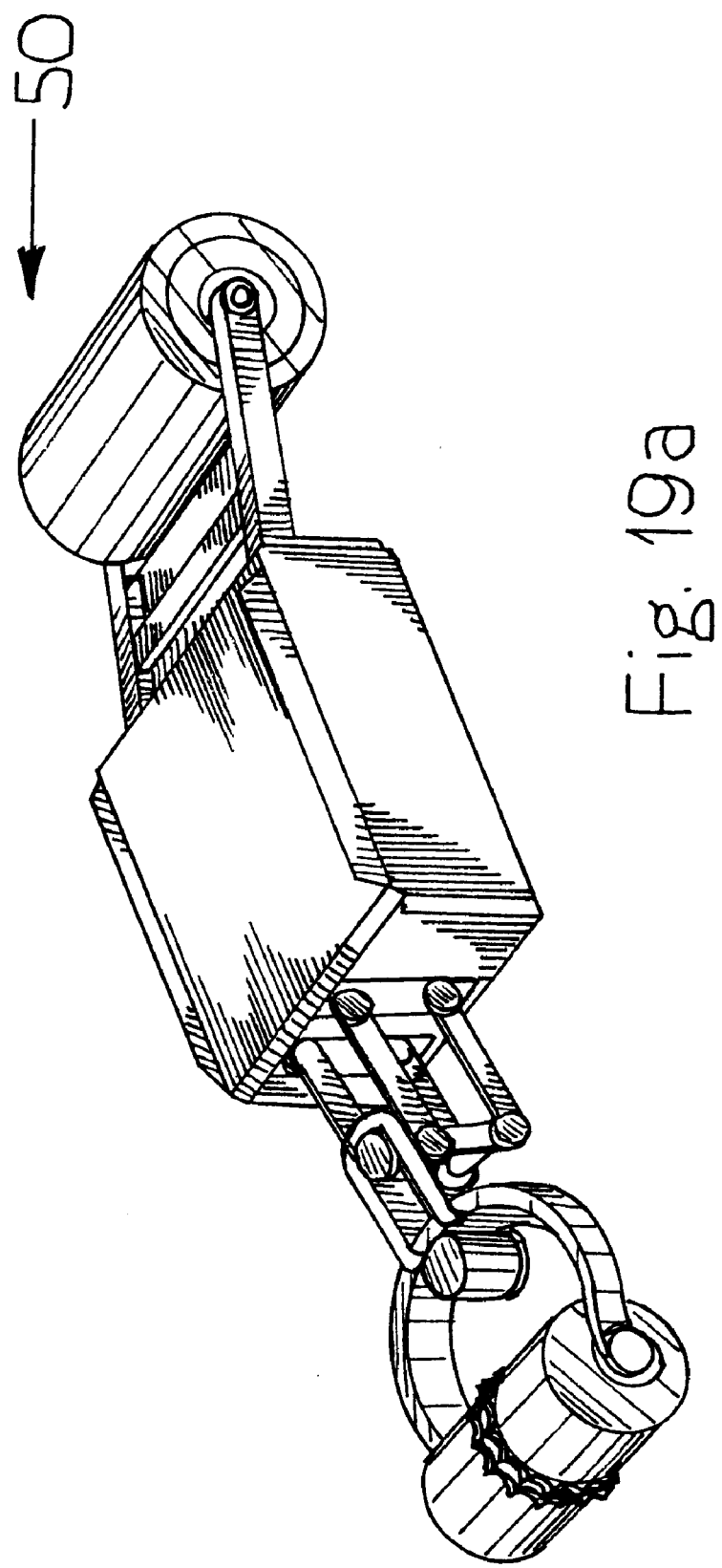
FIGS. 19a–d are various views of the steering mechanism, the drive mechanism, frame and suspension and power source and transmission designs according to the present invention.
Figure 19B:
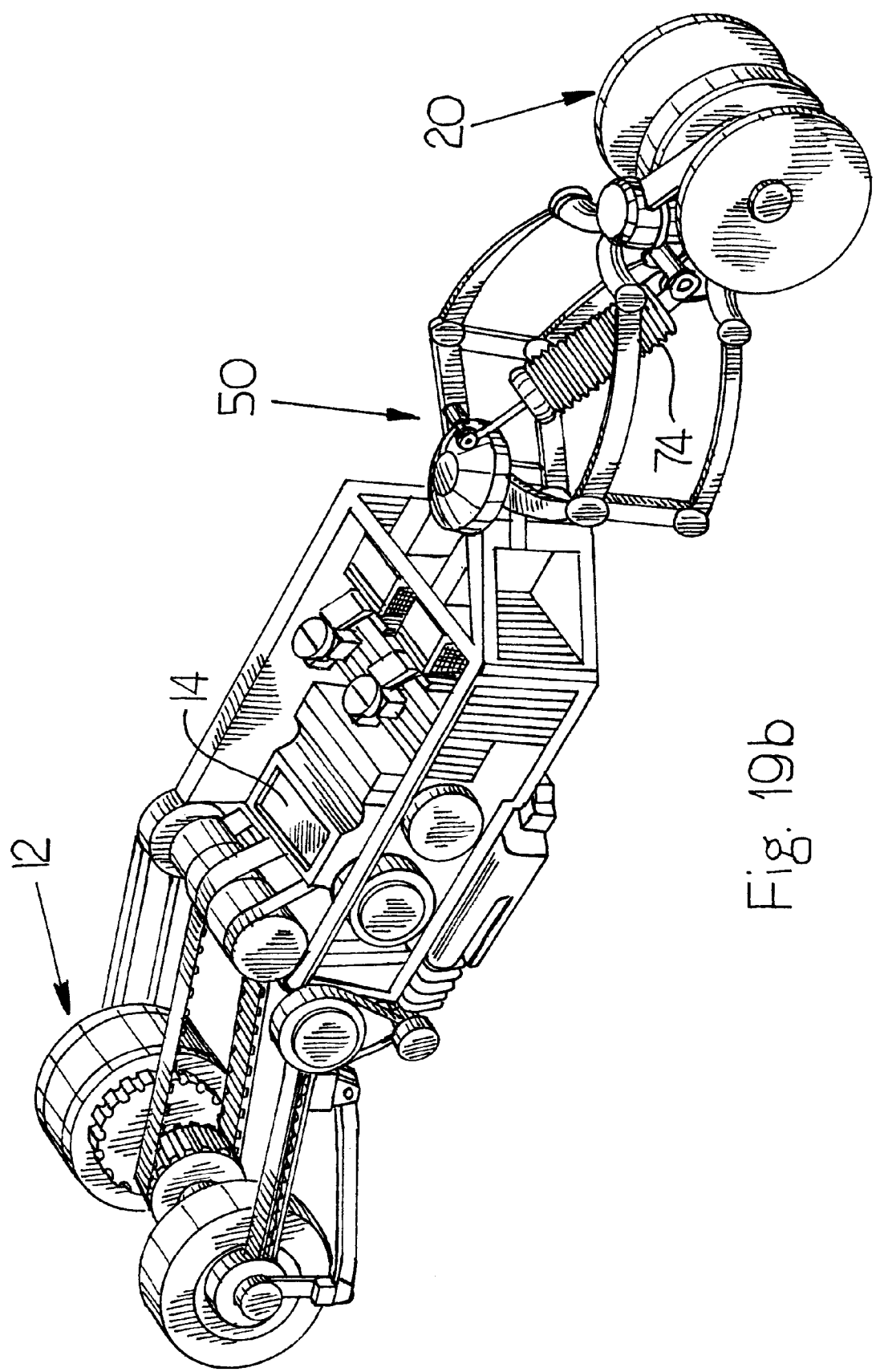
Figure 19C:
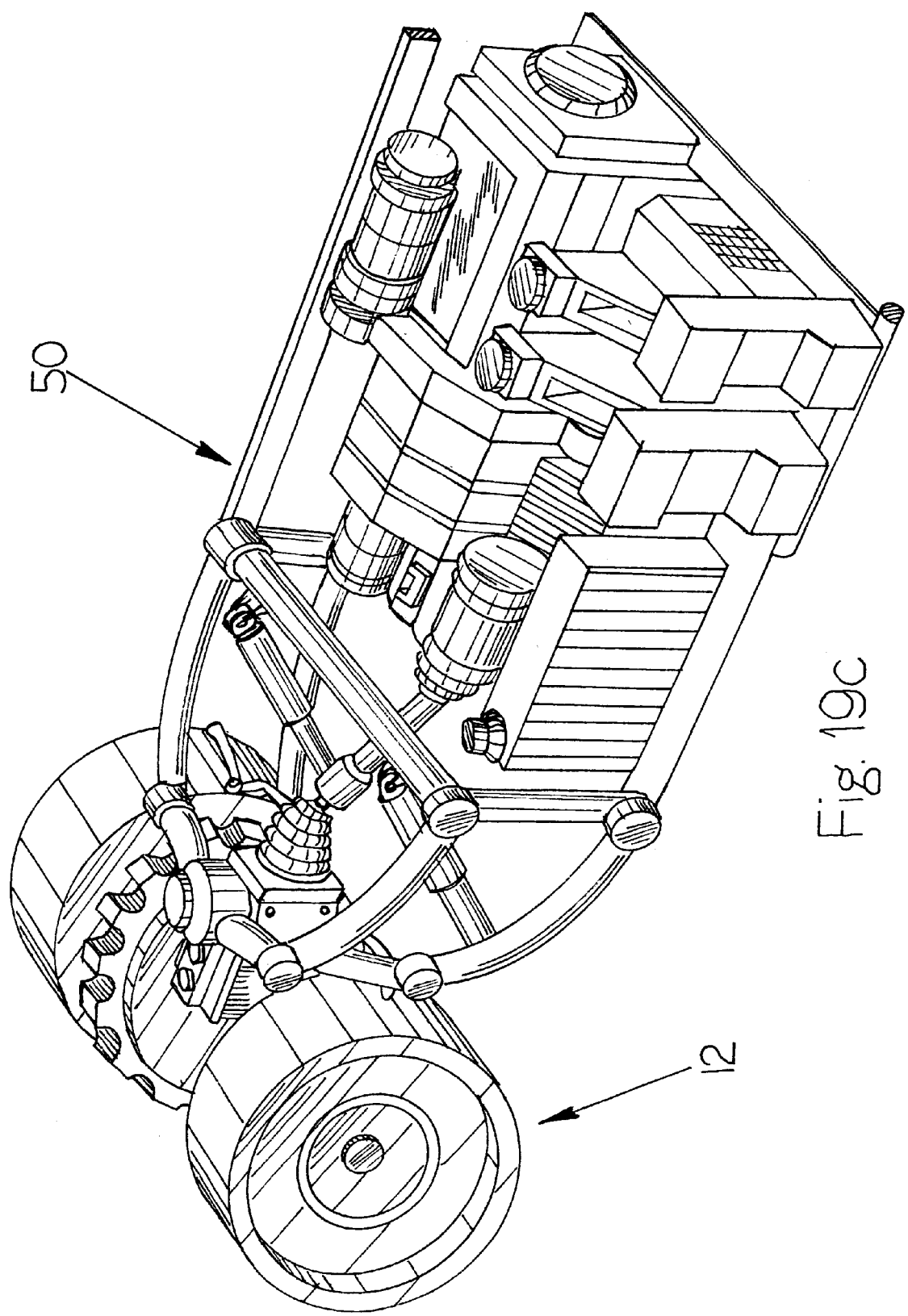
Figure 19D:
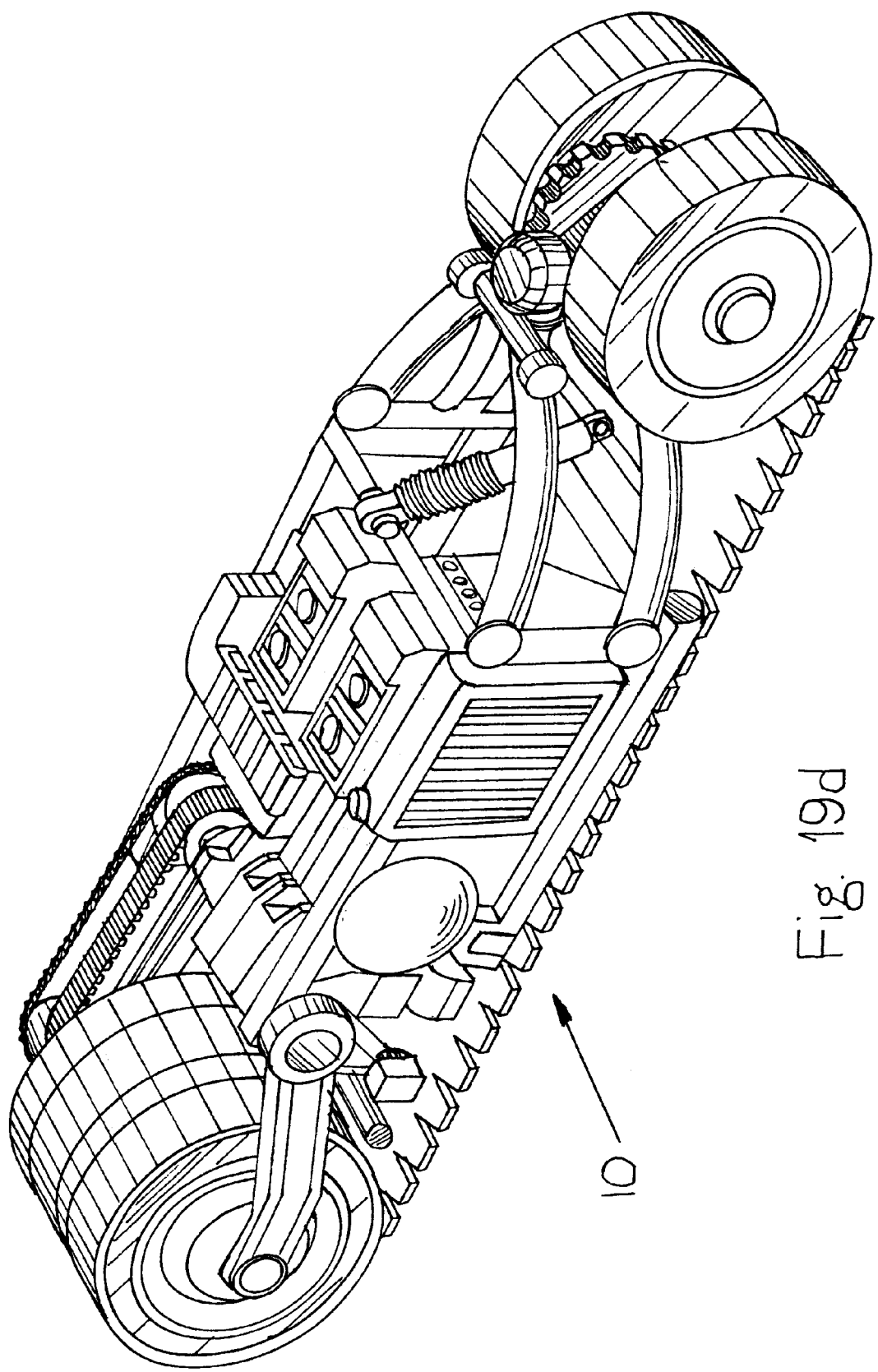

FIG. 17 is another embodiment of the present invention with multiple pivot points. It is envisioned that the present invention is not limited to only one or two pivot mechanisms 16 and/or 22. As the embodiment of FIG. 17 demonstrates, the dynamically steerable mono belt apparatus 10 may have three distinct and separate pivot points. Also, the embodiment of FIG. 17 illustrates a rigid tie rod arrangement tied to a steering mechanism 50 for use as the steering mechanism 50.

Figure 20:
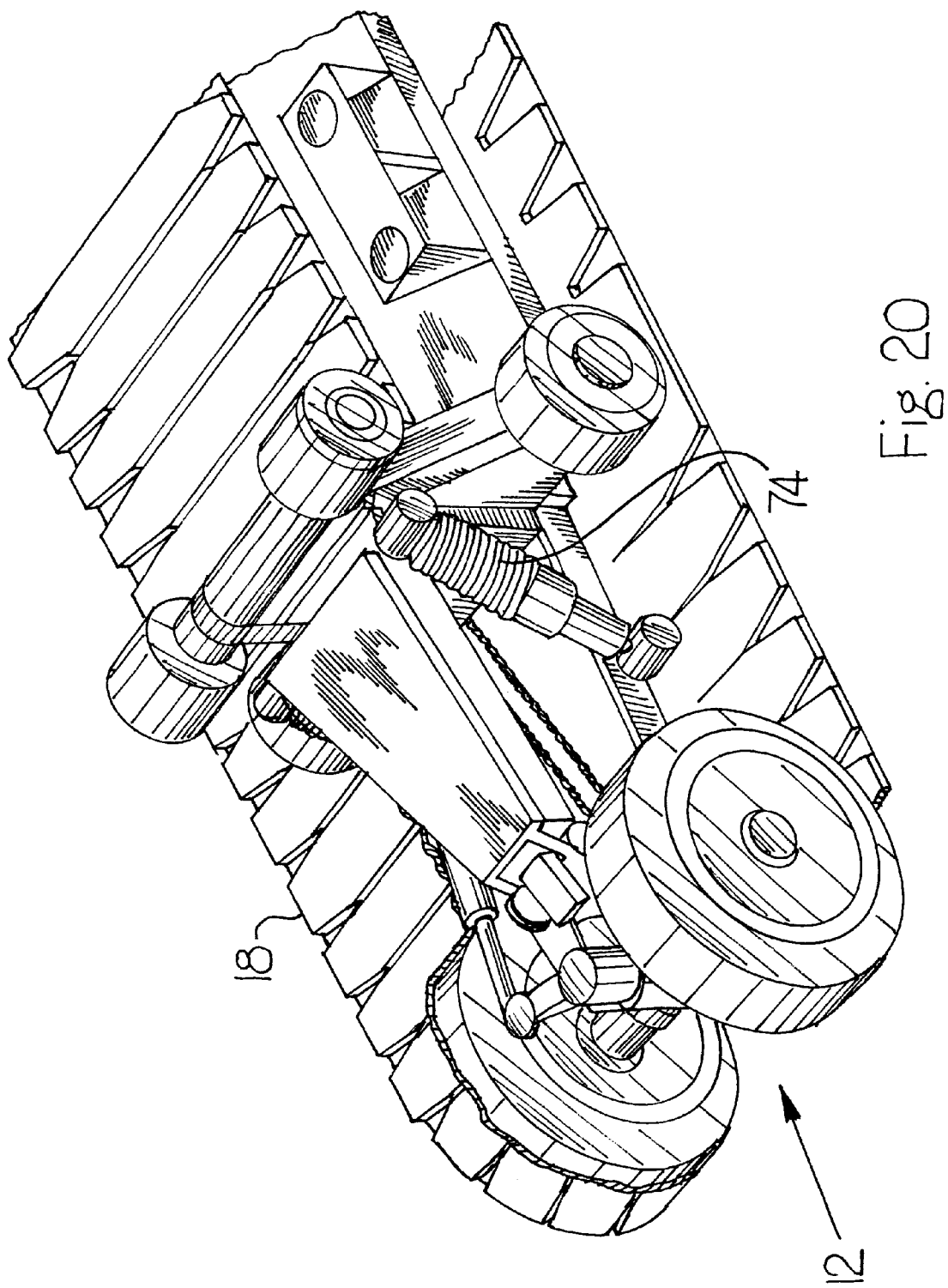
FIG. 20 is a perspective view of a shock absorbing mechanism according to the present invention.
Figure 21A:
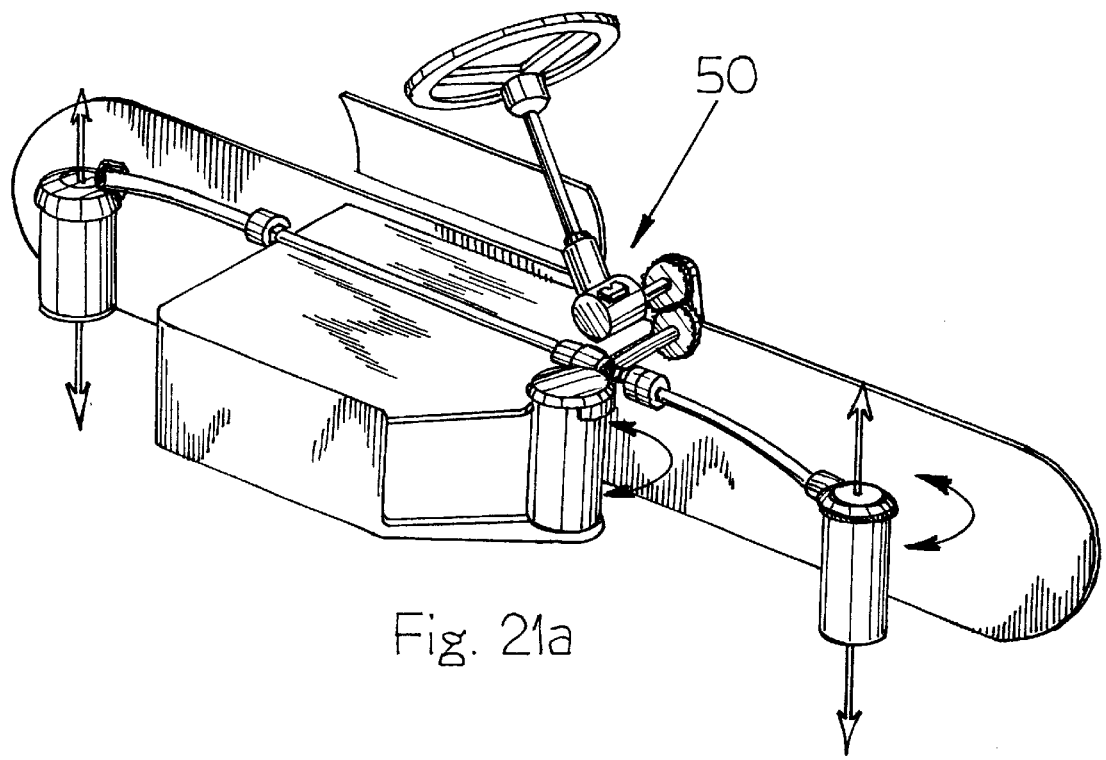
FIGS. 21a–b are perspective views of alternative steering mechanism designs according to the present invention.
Figure 21B:
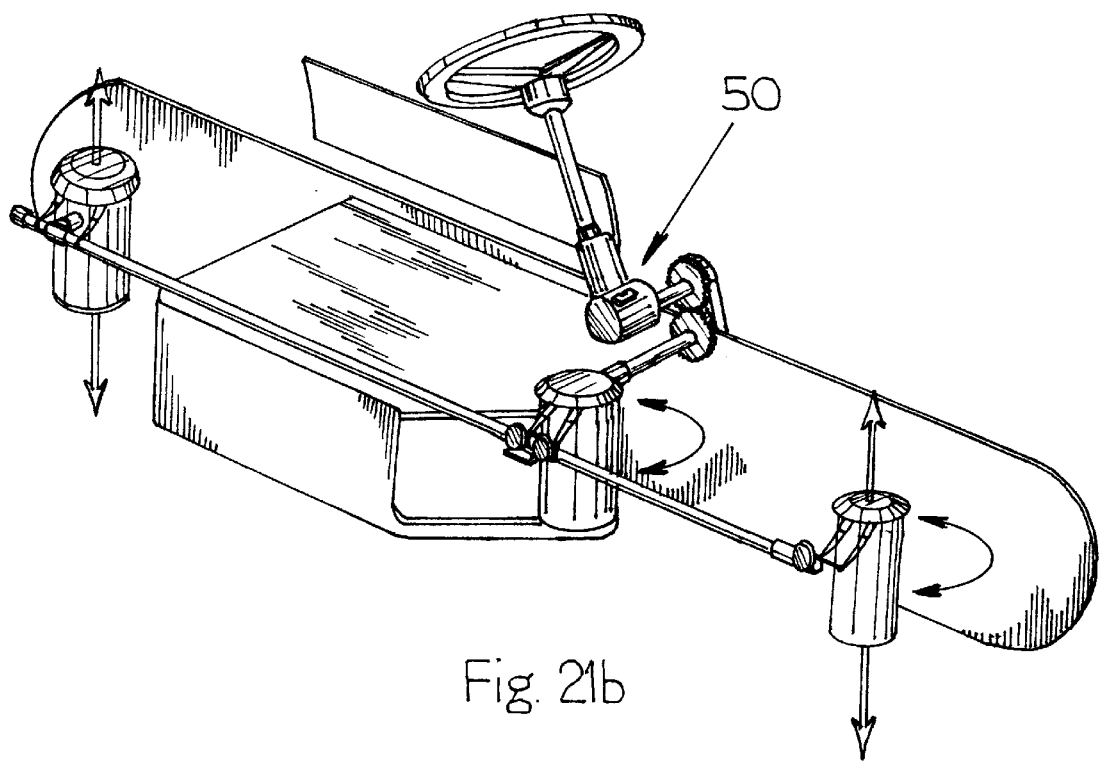
Figure 22:
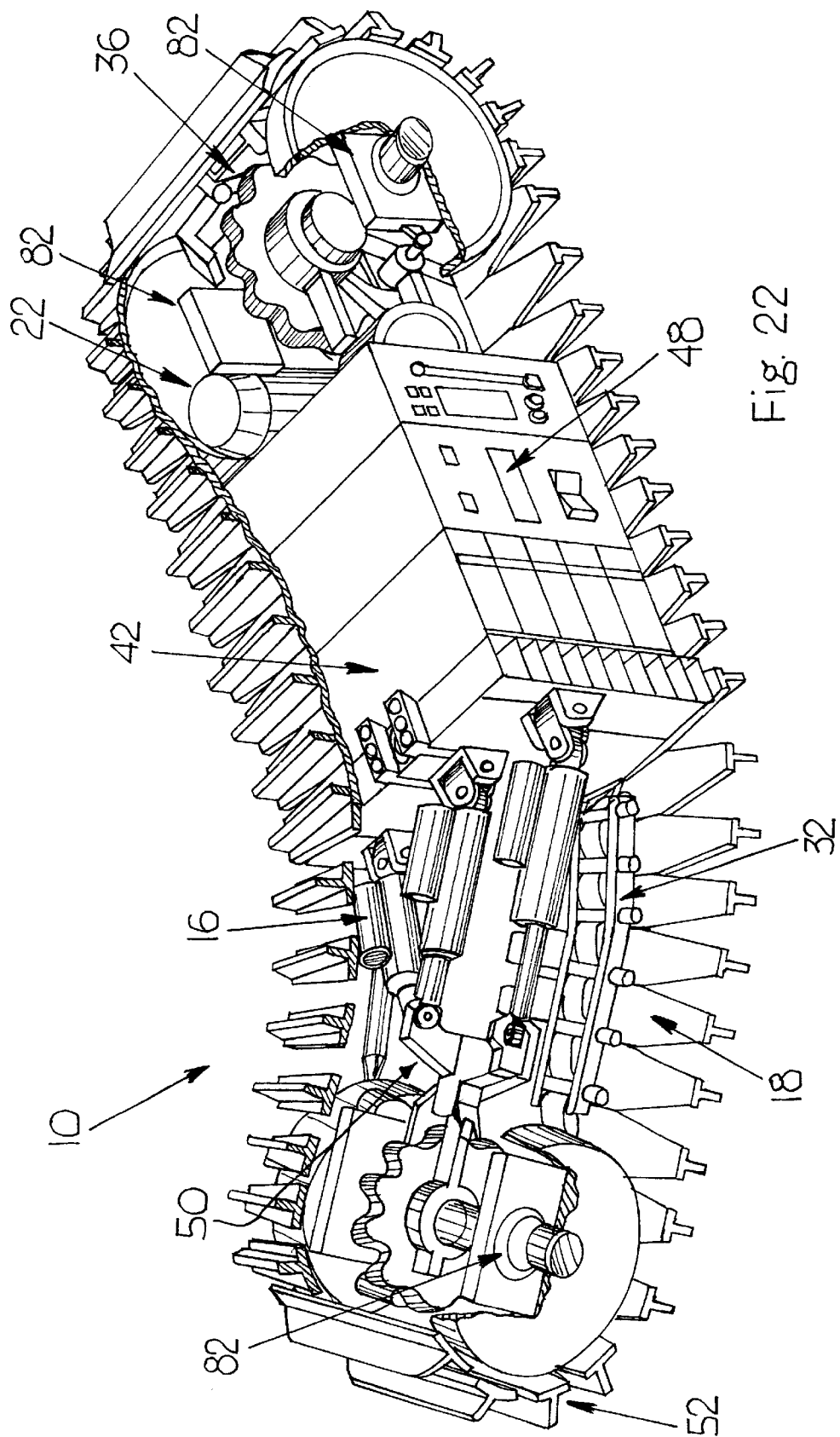
FIG. 22 is a perspective view of the embodiment of FIG. 2 according to the present invention.

FIGS. 18a–d illustrate multiple embodiments of a rear drive and steering design alternatives. For example, a conventional engine with a shaft drive, universal-jointed splined shaft or a twist belt or chain drive is envisioned. Further, a boxer engine with a vertical shaft may be utilized. FIGS. 19a–d illustrate various embodiments directed to the steering mechanism 50, drive mechanism 24 arrangements and interrelationship. Similarly, FIG. 20 is another embodiment of the present invention illustrating a lower cost version of a parallelogram front suspension arrangement. FIG. 21a is a detailed view of the steering mechanism 50, wherein the steering mechanism 50 is a gear box and flex shaft steering arrangement. Similarly, FIG. 21b illustrates the steering mechanism 50 as a gear box and tie rod steering arrangement.

Figure 23:
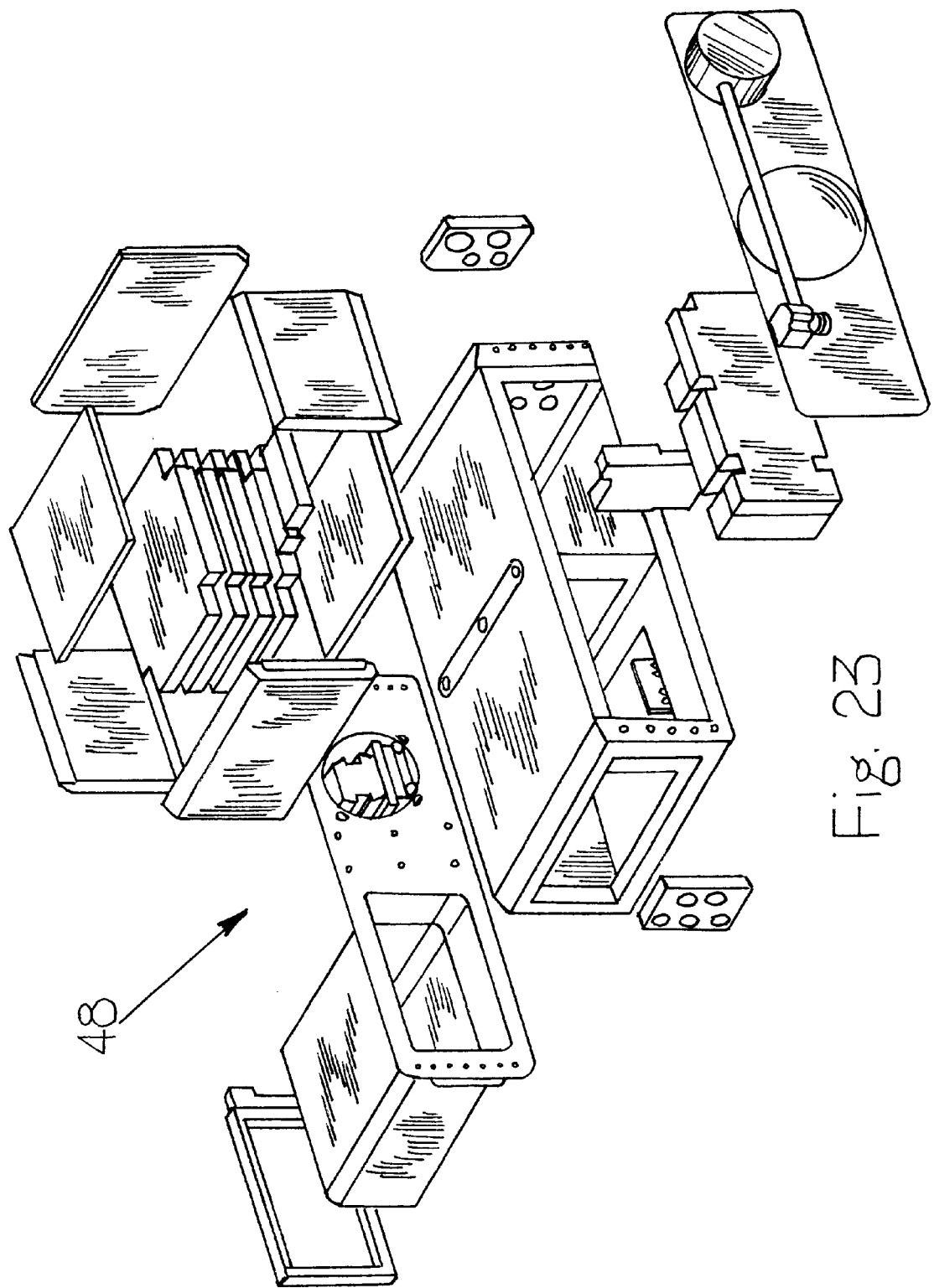
FIG. 23 is an exploded view of a control system according to the present invention.
Figure 24:
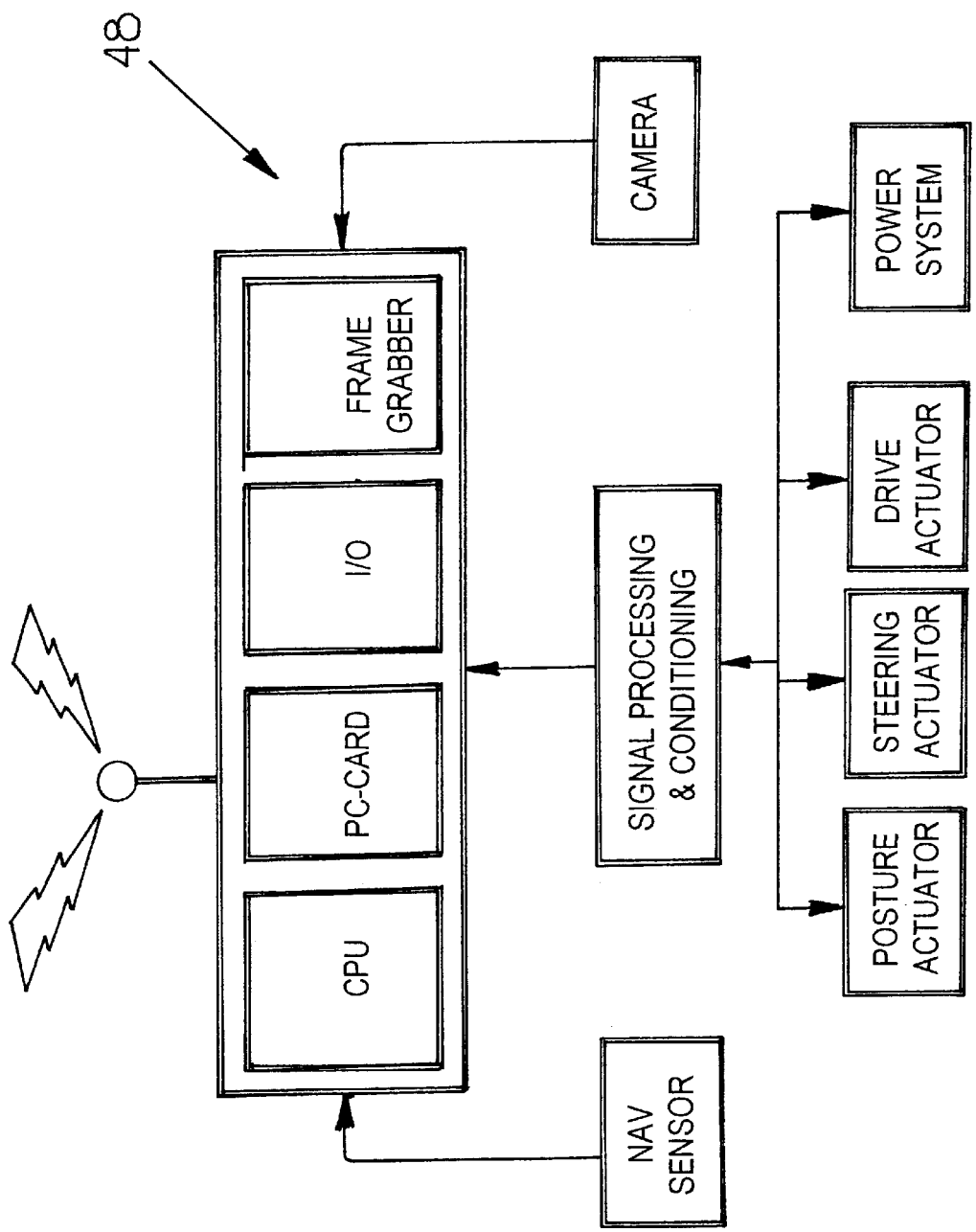
FIG. 24 is a flow diagram of the control system of FIG. 23.

FIG. 23 shows one embodiment of the control system 48, including a battery cover, a battery, side covers, a foam wall, a CPU-stack, a connector block, a compass and tilt sensor, and various other interface electronics, and their physical arrangement in the control system 48. FIG. 24 illustrates the control system 48 and the interrelationship of its various components.

Another application of the dynamically steerable mono belt apparatus 10 is shown in FIG. 25 as a stand-on skate. The skate is based on a scaled-down version of the basic dynamically steerable mono belt apparatus 10, utilizing a simple on/off button to power the skate, and even change the direction of motion. The skate system is intended to be analogous to a skateboard in terms of its motion and steering mode. The skate is not intended to compete with the skateboard, but rather to be an extended system to allow off-road locomotion. The operator stands on the platform 78, which is hinged to cause a linked rotation of the steering axes by virtue of the leaning weight of the operator. Power is provided by battery or internal combustion engine or any other power plant. The drive is housed in one of the pivotable body elements 12, 14 and/or 20 and powers the continuous belt element 18. Instead of the simple cabled on/off and directional switch, the system may also be designed to have a handle and stick similar to a scooter to improve the stability of the operator. When used with a stationery stand-on platform 78, the steering mechanism 50, embodied as a steering bar, would cause the first pivot mechanism 16 and/or a second pivot mechanism 22 to pivot through a mechanical linkage arrangement, making it even more scooter-like in terms of the human driving interface.

Figure 26:
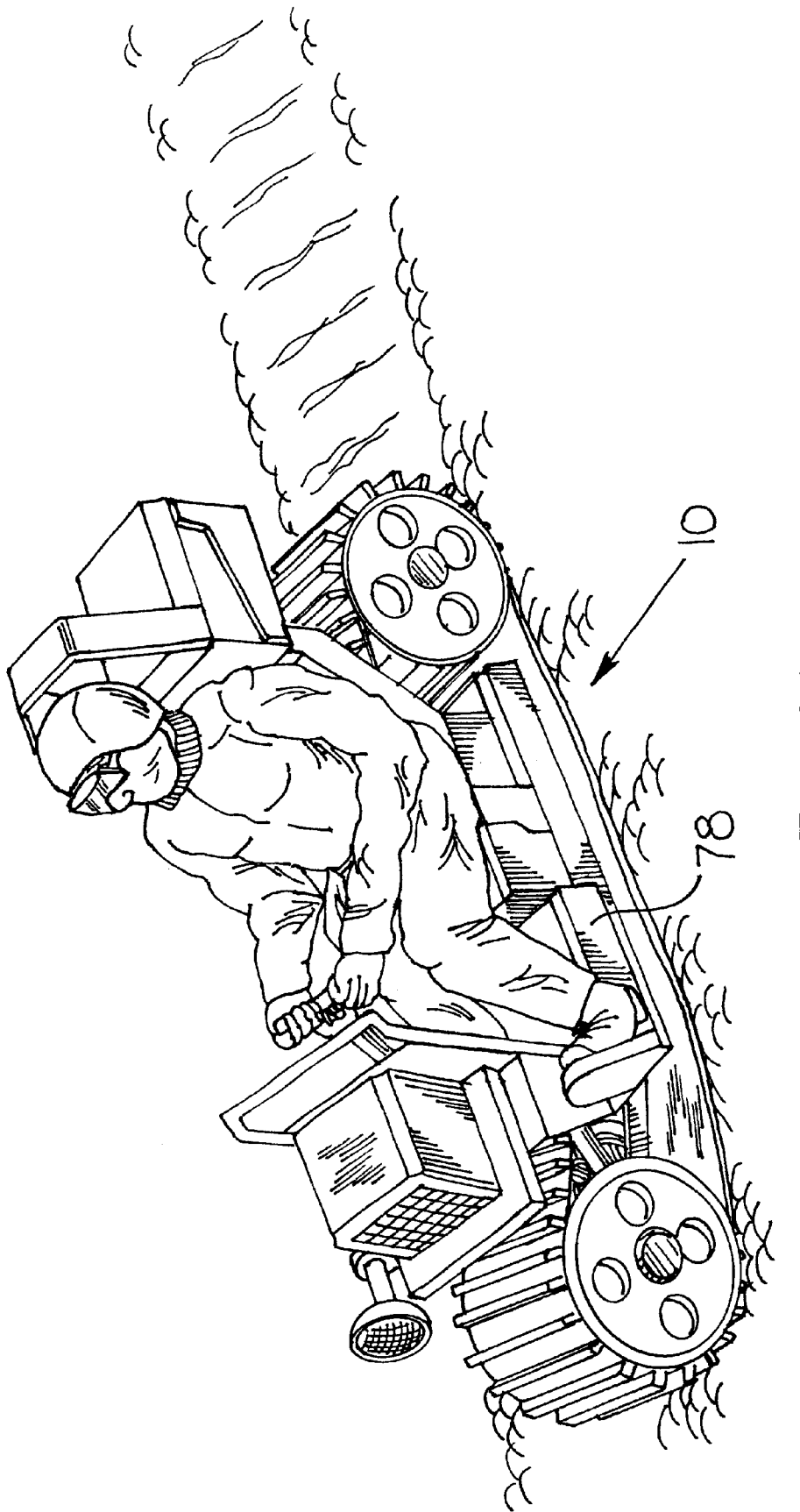
FIG. 26 is a perspective view of a vehicle concept according to the present invention.

Yet another application is illustrated in FIG. 26, where the dynamically steerable mono belt apparatus 10 is used as an all-terrain vehicle. The all-terrain vehicle allows the operator to sit down or recline on a seating area, which gives more space for a longer duration of travel. The all-terrain vehicle should have on-board fuel, and an internal combustion engine, or batteries, or other power source, as well as a sturdier frame and suspension system, to allow for a higher speed and rougher off-road travel. Importantly, the all-terrain vehicle may be used in all seasons to drive off-road, whether in the snow or other soft or hard rocky surfaces or ground. The all-terrain vehicle system is capable of much tighter and higher speed turns than a snowmobile or even a wheeled all-terrain vehicle. In addition, the all-terrain vehicle is able to drive backwards if appropriate clutching or reverse gearing is provided in the gear box or transmission (if mechanically powered; if powered electrically, simply reversing motor-power polarity will cause reverse driving). The steering mechanism 50 of the all-terrain vehicle is a cable drive/shafting/gearing arrangement, based on input from the operator's handlebars or steering wheel. The continuous belt element 18 is equipped with appropriate gripping elements 52, such as embedded steel sections on the continuous belt element 18, which would also allow for the use of carbide-runners on the underside of the frame 72. This would reduce friction in the shock absorbing mechanism 74. Alternatively, the previously discussed roller bogies running on a segmented section of embedded carbide sections in the continuous belt element 18 are envisioned. The front of the all-terrain vehicle contains a wishbone-link suspension-linkage arrangement, coupled with a spring dashpot shock-absorber. This passive pulley/sprocket arrangement is mounted on a hub and carriers similar to fixed guide spines 32, and is responsible for the partial bending of the flexible section of the guide spine 32. The output drive of the internal combustion engine driven transmission/gearbox system is passed to the rear drive shaft. This can be done in a variety of ways, including a belt, splined drive-shaft, chain, etc. The key is that the rear sprocket/pulley arrangement engages the drive spine and powers the entire vehicle through the continuous belt 18. The rear drive section is also mounted on an articulated shock-protected suspension. Again, a semicircular fixed guide spine 32 envelopes the rear drive section to guarantee engagement of the drive spine 38. The flexible section of the guide spine 32 is mounted across the pivot axes and guided and held so as to allow them to take a smooth circular/arch section.

Figure 27C:
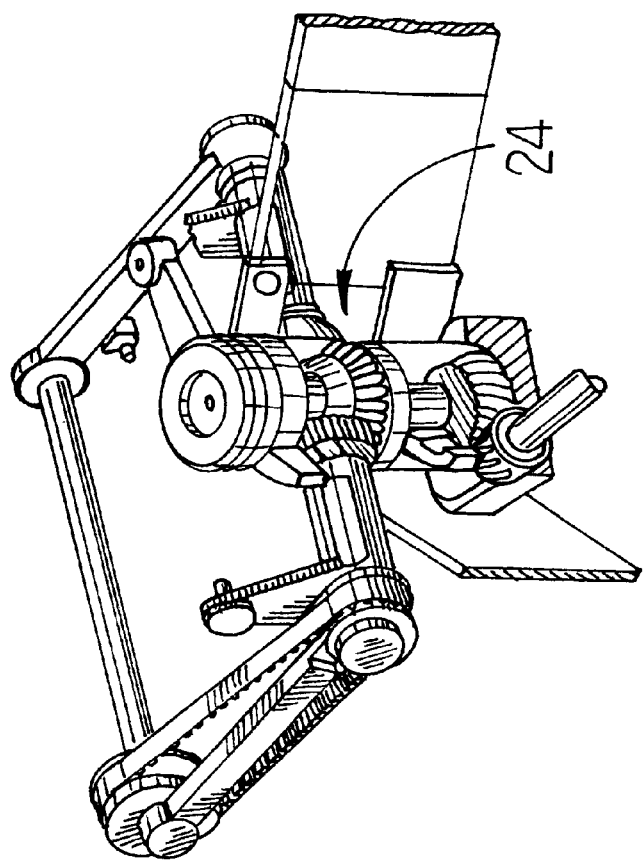
Figure 27A:
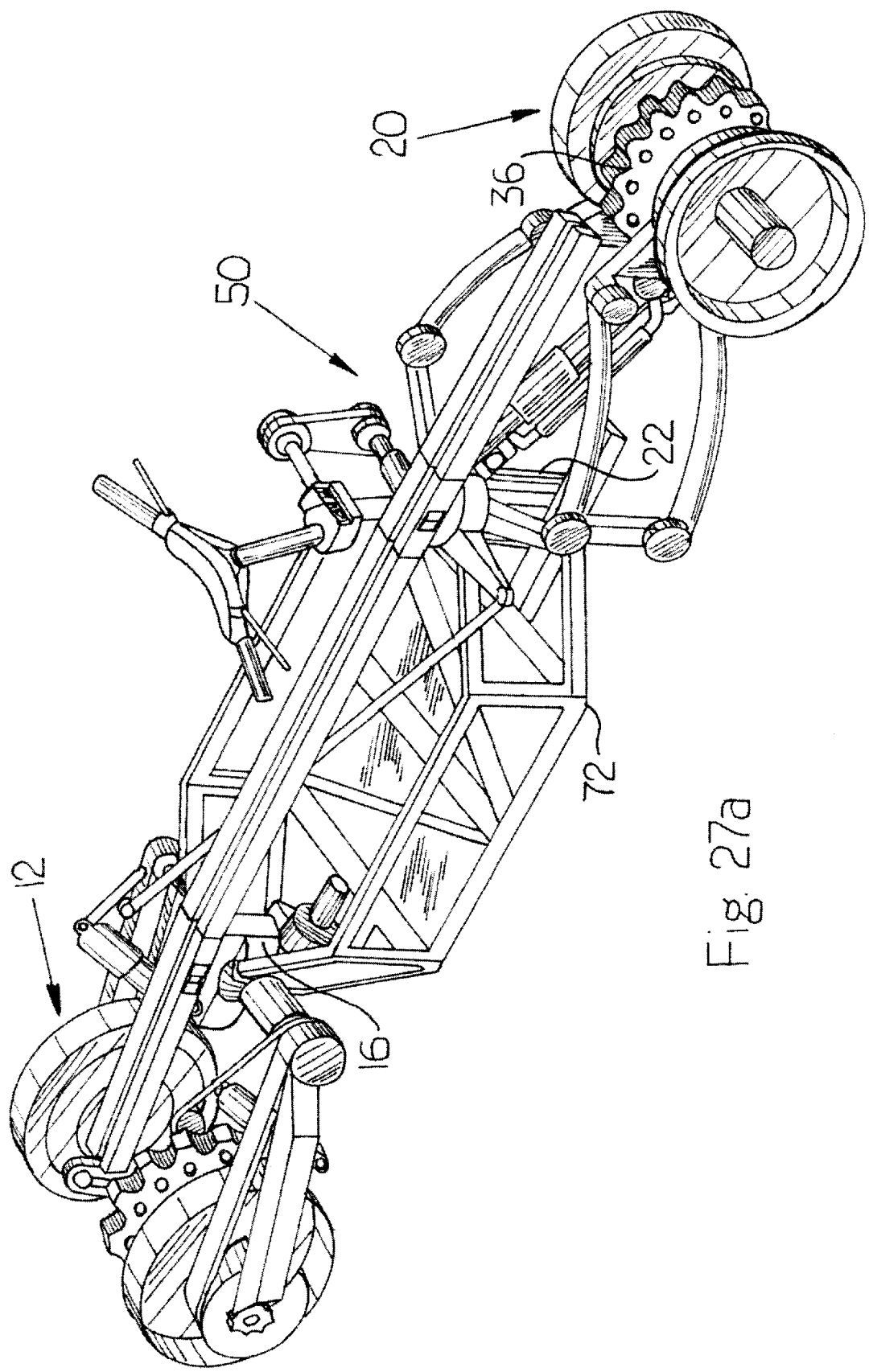

FIGS. 27a–c show still further embodiments of the steering mechanism 50 and first pivot mechanism 16 and/or second pivot mechanism 22, as well as the interrelationship of the various components.

Overall, the present invention is a dynamically steerable mono belt apparatus 10 that allows for dynamic and continuous steering for a vehicle or a conveyor system. As opposed to the friction and grinding of the prior art mechanisms, the dynamically steerable mono belt apparatus 10 allows for smooth and continuous contact with the ground surface upon which it rides for increased applicability.

This invention has been described with reference to the preferred embodiments. Obvious modifications and alterations will occur to others upon reading and understanding the preceding detailed description. It is intended that the invention be construed as including all such modifications and alterations.

We claim:

1. A dynamically steerable belt apparatus, comprising:
   a first pivotable body element;
   a second pivotable body element in communication with the first pivotable body element;
   a first pivot mechanism attached to and positioned between the first pivotable body element and the second pivotable body element and configured to allow the first pivotable body element to pivot in a first pivot plane of movement with respect to the second pivotable body element;
   a third pivotable body element in communication with the second pivotable body element;
   a second pivot mechanism attached to and positioned between the second pivotable body element and the third pivotable body element and configured to allow the third pivotable body element to pivot in a second pivot plane of movement with respect to the second pivotable body element; and
   a continuous belt element formed as a loop and is continuously rotatable in a first plane of rotation around the first pivotable body element, the first pivot mechanism, the second pivotable body element, the second pivot mechanism and the third pivotable body element,
   wherein the continuous belt element is flexible in the first pivot plane of movement, such that when the first pivotable body element is pivoted, via the first pivot mechanism, in the first pivot plane of movement, the continuous belt element is flexed,
   wherein the continuous belt element is flexible in the second pivot plane of movement, such that when the third pivotable body element is pivoted, via the second pivot mechanism, in the second pivot plane of movement, the continuous belt element is flexed, and
   wherein the first pivotable body element and the third pivotable body element are configured to pivot independently of each other.

2. The dynamically steerable belt apparatus of claim 1, wherein the first pivot plane of movement is perpendicular to the first plane of rotation, such that when the first pivotable body element is pivoted, via the first pivot mechanism, in the first pivot plane of movement, the continuous belt element is flexed, thereby creating a second plane of rotation of the continuous belt element.

3. The dynamically steerable belt apparatus of claim 1, wherein the first pivot plane of movement is parallel to the first plane of rotation.

4. The dynamically steerable belt apparatus of claim 1, wherein the dynamically steerable mono belt apparatus is used as a vehicle.

5. The dynamically steerable belt apparatus of claim 1, wherein the second pivot plane of movement is perpendicular to the first plane of rotation, such that when the third pivotable body element is pivoted, via the second pivot mechanism, in the second pivot plane of movement, the continuous belt element is flexed, thereby creating a second plane of rotation of the continuous belt element.

6. The dynamically steerable belt apparatus of claim 1, wherein the second pivot plane of movement is parallel to the first plane of rotation.

7. The dynamically steerable belt apparatus of claim 1, wherein one of the first pivotable body element and the second pivotable body element comprise a drive mechanism configured to drive the continuous belt element and the first pivot mechanism.

8. The dynamically steerable belt apparatus of claim 7, wherein the drive mechanism is powered by a power source.

9. The dynamically steerable belt apparatus of claim 1, further comprising a rotation system configured to rotatably secure the continuous belt element to the first pivotable body element and the second pivotable body element.

10. The dynamically steerable belt apparatus of claim 9, wherein the rotation system comprises a first pivotable body element engaging mechanism attached to the first pivotable body element and rotatable in the first plane of rotation;

a second pivotable body element engaging mechanism attached to the second pivotable body element and rotatable in the first plane of rotation;

at least one drive spine attached to and extending away from an inner surface of the continuous belt element; and a plurality of engagement elements attached to and extending from the drive spine and engageable with the first pivotable body element engaging mechanism and the second pivotable body element engaging mechanism;

such that when the continuous element is rotated in the first plane of rotation, the engagement elements of the drive spine are engaged by the second pivotable body element engaging mechanism thereby continuously rotating the continuous belt element in the first plane of rotation; and such that when the first pivot mechanism is pivoted in the first pivot plane of movement, the engagement elements of the drive spine are engaged by the first pivotable body element engaging mechanism and the continuous belt element is flexed.

11. The dynamically steerable belt apparatus of claim 10, wherein the rotation system further comprises at least one guide spine attached to one of the first pivotable body element and the second pivotable body element and having a guide spine slot therein, such that the engagement elements are engageable with the guide spine slot.

12. The dynamically steerable belt apparatus of claim 11, wherein the at least one guide spine is flexible and configured to allow the plurality of engagement elements to move in a continuous path around the first pivotable body element engaging mechanism, through the guide spine slot and around the second pivotable body element engaging mechanism, while the first pivot mechanism is pivoted.

13. The dynamically steerable belt apparatus of claim 12, further comprising at least one guide spine longitudinal flex slot attached to at least one of the first pivotable body element and the second pivotable body element and configured to accept a first end of the at least one guide spine such that, when the guide spine is flexed, the first end of the at least one guide spine is longitudinally moveable along the guide spine longitudinal flex slot.

14. The dynamically steerable belt apparatus of claim 12, further comprising:

a lateral guide element attached to the guide spine; and at least one guide spine lateral flex slot attached to at least one of the first pivotable body element and the second pivotable body element and configured to accept the lateral guide element on the guide spine such that, when the guide spine is flexed, the lateral guide element is laterally moveable along the guide spine lateral flex slot.

15. The dynamically steerable belt apparatus of claim 10, wherein the first pivotable body element engaging mechanism comprises a first dual sprocket arrangement, the second pivotable body element engaging mechanism comprises a second dual sprocket arrangement, and each engagement element is a pin configured to engage the first dual sprocket arrangement and the second dual sprocket arrangement.

16. The dynamically steerable belt apparatus of claim 1, further comprising a control system located within one of the first pivotable body element and the second pivotable body element and configured to control functions of the dynamically steerable mono belt apparatus.

17. The dynamically steerable belt apparatus of claim 16, further comprising a steering mechanism in communication with the first pivot mechanism via the control system, wherein a user utilizes the steering mechanism to pivot the first pivot mechanism.

18. The dynamically steerable belt apparatus of claim 1, further comprising a steering mechanism in communication with the first pivot mechanism, wherein a user utilizes the steering mechanism to pivot the first pivot mechanism.

19. The dynamically steerable belt apparatus of claim 1, wherein the first pivot mechanism is configured to pivot in a pivot plane of movement parallel to the first plane of rotation.

20. The dynamically steerable belt apparatus of claim 1, wherein the first pivot mechanism is configured to pivot in a plane of movement perpendicular to a second plane of rotation.

21. The dynamically steerable belt apparatus of claim 1, further comprising at least one gripping element attached to and extending away from an outer surface of the continuous belt element and configured to provide traction between the continuous belt element and a surface.

22. The dynamically steerable belt apparatus of claim 1, wherein the continuous belt element is a continuous surface-webbing elastomeric-based material.

23. The dynamically steerable belt apparatus of claim 1, wherein the continuous belt element comprises a plurality of overlappable and adjacent plates, such that when the plates are turned, a first portion on each plate slides into a first plate recess of the preceding plate, and a second portion of each plate slides into a second plate recess of the succeeding plate, thereby allowing the continuous belt element to continuously contact the surface.

24. The dynamically steerable belt apparatus of claim 1, wherein the continuous belt element comprises a plurality of gapped plates having two or more gapped portions bridged with a compliant material, such that when the gapped plates are turned, the compliant material of a gapped portion collapses and allows the gapped portion to abut an adjacent gapped plate, thereby allowing the continuous belt element to continuously contact the surface.

25. The dynamically steerable belt apparatus of claim 24, wherein the compliant material is one of a cloth material and an elastomeric material.

26. The dynamically steerable belt apparatus of claim 1, wherein the first pivot mechanism is a pivoting hinge configured to pivot in the first pivot plane of movement.

27. The dynamically steerable belt apparatus of claim 1, further comprising a shock absorbing mechanism in communication with the first pivotable body element and the second pivotable body element and configured to provide suspension to the dynamically steerable mono belt apparatus.

28. The dynamically steerable belt apparatus of claim 27, wherein the shock absorbing mechanism is a spring-loaded bogie arrangement.

29. The dynamically steerable belt apparatus of claim 27, wherein the shock absorbing mechanism is a spring and dashpot arrangement.

30. The dynamically steerable belt apparatus of claim 1, further comprising at least one support rib attached to or integrally formed with the continuous belt element to strengthen the continuous belt element.

31. The dynamically steerable belt apparatus of claim 1, further comprising a platform attached to one of the first pivotable body element and the second pivotable body element and configured to allow at least one object to rest on the platform above the continuous belt element.

32. The dynamically steerable belt apparatus of claim 1, further comprising at least one paddle attached to one of the first pivotable body element and the second pivotable body element and extending away from and in front of one of the first pivotable body element and the second pivotable body element.

33. The dynamically steerable belt apparatus of claim 1, wherein the dynamically steerable mono belt apparatus is used as a conveyor.

34. A vehicle, comprising:
a first pivotable body element;
a second pivotable body element in communication with the first pivotable body element;
a third pivotable body element in communication with the second pivotable body element;
a first pivot mechanism attached to and positioned between the first pivotable body element and the second pivotable body element and configured to allow the first pivotable body element to pivot in a first pivot plane of movement with respect to the second pivotable body element;
a second pivot mechanism attached to and positioned between the second pivotable body element and the third pivotable body element and configured to allow the third pivotable body element to pivot in a second pivot plane of movement with respect to the second pivotable body element;
a continuous belt element formed as a loop and continuously rotatable in a first plane of rotation around the first pivotable body element, the first pivot mechanism, the second pivotable body element, the second pivot mechanism and the third pivotable body element and wherein the continuous belt element is flexible in the first pivot plane of movement and the second pivot plane of movement;
wherein one of the first pivotable body element, the second pivotable body element and the third pivotable body element comprise a drive mechanism configured to drive the continuous belt element, the first pivot mechanism and the second pivot mechanism;
wherein the first pivotable body element and the third pivotable body element are configured to pivot independently of each other;
a rotation system configured to rotatably secure the continuous belt element to the first pivotable body element, the second pivotable body element and the third pivotable body element;
a control system located within one of the first pivotable body element, the second pivotable body element and the third pivotable body element and configured to control functions of the vehicle;
a steering mechanism in communication with the first pivot mechanism and the second pivot mechanism via the control system, wherein a user utilizes the steering mechanism to pivot the first pivot mechanism and the second pivot mechanism;
a platform attached to one of the first pivotable body element, the second pivotable body element and the third pivotable body element and configured to allow a driver of the vehicle to rest on the platform above the continuous belt element.

35. A dynamically steerable belt apparatus, comprising:
a first pivotable body element;
a second pivotable body element in communication with the first pivotable body element;
a first pivot mechanism attached to and positioned between the first pivotable body element and the second pivotable body element and configured to allow the first pivotable body element to pivot in a first pivot plane of movement with respect to the second pivotable body element; and
a continuous belt element formed as a loop and continuously rotatable in a first plane of rotation around the first pivotable body element, the first pivot mechanism and the second pivotable body element,
wherein the continuous belt element is flexible in the first pivot plane of movement, such that when the first pivotable body element is pivoted, via the first pivot mechanism, in the first pivot plane of movement, the continuous belt element is flexed, and
wherein the first pivot plane of movement is parallel to the first plane of rotation.

* * * * *